United States Patent
Maheshwari et al.

(10) Patent No.: US 11,860,932 B2
(45) Date of Patent: Jan. 2, 2024

(54) SCENE GRAPH EMBEDDINGS USING RELATIVE SIMILARITY SUPERVISION

(71) Applicant: ADOBE INC., San Jose, CA (US)

(72) Inventors: Paridhi Maheshwari, Bhopal (IN); Ritwick Chaudhry, Chandigarh (IN); Vishwa Vinay, Bangalore (IN)

(73) Assignee: ADOBE, INC., San Jose, CA (US)

( * ) Notice: Subject to any disclaimer, the term of this patent is extended or adjusted under 35 U.S.C. 154(b) by 264 days.

(21) Appl. No.: 17/337,801

(22) Filed: Jun. 3, 2021

(65) Prior Publication Data

US 2022/0391433 A1    Dec. 8, 2022

(51) Int. Cl.
| | |
|---|---|
| *G06F 16/50* | (2019.01) |
| *G06F 16/55* | (2019.01) |
| *G06F 16/56* | (2019.01) |
| *G06F 16/538* | (2019.01) |
| *G06F 16/583* | (2019.01) |

(52) U.S. Cl.
CPC ............ *G06F 16/55* (2019.01); *G06F 16/538* (2019.01); *G06F 16/56* (2019.01); *G06F 16/583* (2019.01); *G06F 16/5854* (2019.01)

(58) Field of Classification Search
CPC .............................. G06F 16/55; G06F 16/5854
See application file for complete search history.

(56) References Cited

U.S. PATENT DOCUMENTS

2021/0191975 A1* 6/2021 Lu .................... G06F 16/583

OTHER PUBLICATIONS

Xu et al., Scene Graph Generation by Iterative Message Passing, arXiv preprint, arXiv:1701.02426v2 [cs.CV] Apr. 12, 2017, 10 pages (Year: 2017).*
Abhijit Suprem, "Approximate Query Matching for Image Retrieval," arXiv preprint, arXiv:1803.05401v1 [cs.CV] Mar. 14, 2018, 13 pages (Year: 2018).*
Yang et al., "Graph R-CNN for Scene Graph Generation" arXiv preprint, arXiv:1808.00191v1 [cs.CV] Aug. 1, 2018, 16 pages (Year: 2018).*
1Maheshwari, et al., "Scene Graph Embecidings Using Relative Similarity Supervision"; arXiv preprint arXiv:2104.023.81v1 [cs.Cv]Apr. 6, 2021, 9 pages.

* cited by examiner

*Primary Examiner* — Kristopher Andersen
(74) *Attorney, Agent, or Firm* — F. CHAU & ASSOCIATES, LLC

(57) ABSTRACT

Systems and methods for image processing are described. One or more embodiments of the present disclosure identify an image including a plurality of objects, generate a scene graph of the image including a node representing an object and an edge representing a relationship between two of the objects, generate a node vector for the node, wherein the node vector represents semantic information of the object, generate an edge vector for the edge, wherein the edge vector represents semantic information of the relationship, generate a scene graph embedding based on the node vector and the edge vector using a graph convolutional network (GCN), and assign metadata to the image based on the scene graph embedding.

11 Claims, 12 Drawing Sheets

SCENE GRAPH EMBEDDINGS USING RELATIVE SIMILARITY SUPERVISION

BACKGROUND

The following relates generally to information retrieval, and more specifically to information retrieval based on scene graph embeddings.

Information retrieval refers to the task of extracting information resources based on a query. In some cases, information retrieval includes identifying relevant search objects from a database and comparing the search objects to a query object. For example, a user may provide a text description or an image as a query, and a search engine may find images that are similar or relevant to the query. An example of an image retrieval task includes extracting similar images to an image query.

In some cases, information retrieval systems represent query objects and search objects as multi-dimensional vectors in an embedding space. The vector representations may capture the semantic meaning and other attributes such as color information, metadata, or classification tags. An information retrieval system such as a search engine can retrieve relevant documents by comparing the embedded representation of the query to the embedded representations of the documents stored in a database (i.e., the search objects). Recently, information retrieval systems have used neural networks and other sophisticated embedding systems to generate complex, high dimensional embeddings that are capable of comparing and differentiating a large number of different text or image objects.

However, conventional image retrieval systems are limited to capturing certain visually discriminative features (as opposed to semantic information). Therefore, there is a need in the art for improved image retrieval systems that can close the semantic gap through capturing the higher order concepts in the image, in addition to lower lever visual features.

SUMMARY

The present disclosure describes systems and methods for information retrieval. Some embodiments of the disclosure include an image processing apparatus configured to generate a scene graph and subsequently, a scene graph embedding from a query image. For example, a machine learning model (i.e., an image processing network) may be trained based on a ranking loss function. The ranking loss function may incorporate contrastive learning techniques and may operate on pairs of similar and dissimilar images by imposing a relative ordering between the images in the embedding space. In some embodiments, an efficient sampling technique is used to sample a triplet including an anchor image, a positive image, and a negative image. The trained network can be used for semantic image retrieval by capturing high-order concepts based on a set of objects in the image and their relationships, and using the captured information to index the image in a database.

A method, apparatus, and non-transitory computer readable medium for information retrieval are described. One or more embodiments of the method, apparatus, and non-transitory computer readable medium include identifying an image comprising a plurality of objects, generating a scene graph of the image comprising a node representing an object and an edge representing a relationship between two of the objects, generating a node vector for the node, wherein the node vector represents semantic information of the object, generating an edge vector for the edge, wherein the edge vector represents semantic information of the relationship, generating a scene graph embedding based on the node vector and the edge vector using a graph convolutional network (GCN), and assigning metadata to the image based on the scene graph embedding.

An apparatus and method for information retrieval are described. One or more embodiments of the apparatus and method include a scene graph generator configured to generate a scene graph of an image comprising a node representing an object and an edge representing a relationship between two of the objects, a word embedding component configured to generate a node vector for the node, wherein the node vector represents semantic information of the object and an edge vector for the edge, and wherein the edge vector represents semantic information of the relationship, and a GCN configured to generate a scene graph embedding based on the node vector and the edge vector.

A method, apparatus, and non-transitory computer readable medium for training a network are described. One or more embodiments of the method, apparatus, and non-transitory computer readable medium include identifying training data including a plurality of images and similarity information for pairs of the images, generating a scene graph of an image in the training data, generating a scene graph embedding based on the scene graph using a GCN, computing a ranking loss function based on the scene graph embedding and the similarity information, and training the GCN based on the ranking loss function.

DETAILED DESCRIPTION

Figure 1:
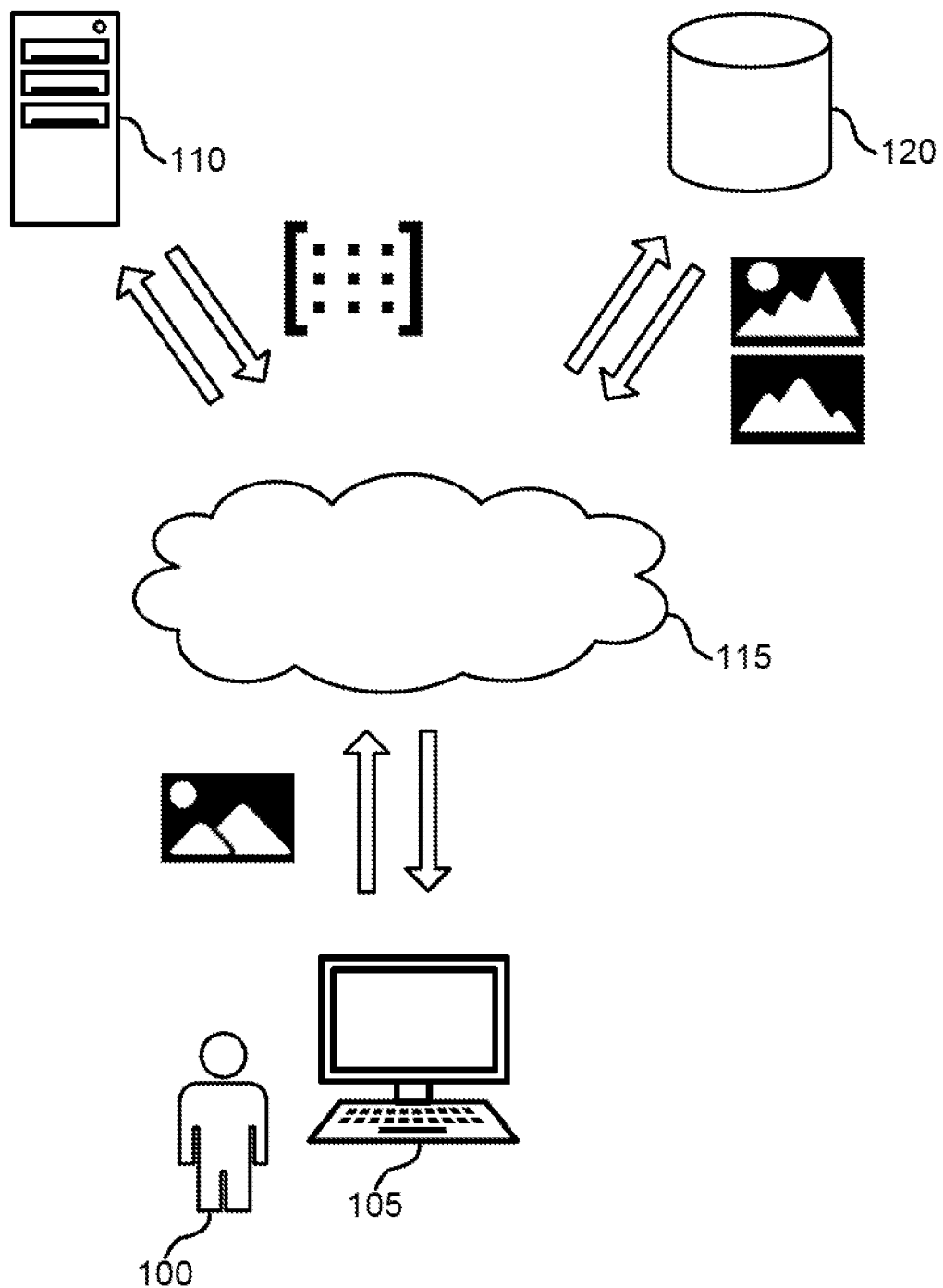
FIG. 1 shows an example of an image retrieval system according to aspects of the present disclosure.

The present disclosure describes systems and methods for information retrieval. Some embodiments of the disclosure include an image processing apparatus configured to generate a scene graph and subsequently, a scene graph embedding of a query image. For example, a machine learning model (i.e., an image processing network) may be trained based on a ranking loss function. The ranking loss function, incorporating contrastive learning techniques, operates on pairs of similar and dissimilar images and imposes relative ordering between these images in the embedding space. In some embodiments, an efficient sampling technique is used to sample a triplet of an anchor image, a positive image, and a negative image. The trained network can be used for semantic image retrieval. For example, the image processing apparatus may generate image meta-data that captures high-order concepts based on a set of objects and their relationships.

Recently, machine learning models such as deep convolutional neural networks (CNNs) have been used for content-based image retrieval (CBIR) tasks. These models are often pre-trained on image classification datasets and they are limited to capturing visually discriminative features. Therefore, conventional CBIR systems yield results which are visually similar to the query. For example, if an image query includes an image of a palm tree, conventional retrieval systems may retrieve both images of other trees and images of spiders because the branches of a tree and the legs of a spider have visual resemblance. Thus, conventional CBIR systems lack understanding of the semantics of the scene in an image and are accurate for images that are simple (e.g., fewer objects and relationships) and visually similar.

Embodiments of the present disclosure provide a neural network trained to generate a scene graph of the image and subsequently, a scene graph embedding of an image. In some embodiments, a graph convolutional network (GCN) is used to process scene graphs into scene graph embeddings that capture graph-based structural information or semantic information in a scene. In some examples, a weak supervision signal of ranking preferences from the text modality (e.g., image captions) is used to train the network model.

Some embodiments of the present disclosure include an image processing apparatus that generates a scene graph embedding corresponding to a query image and performs image retrieval based on the scene graph embedding. A GCN is used to generate the scene graph embedding, rather than depending on pixel information or unstructured text. Additionally, the image processing apparatus applies weak pairwise similarity supervision from text modality and is trained based on a ranking loss function. The ranking loss function, incorporating contrastive learning techniques, operates on pairs of similar and dissimilar images and imposes relative ordering between these images in the embedding space. In an embodiment, an efficient sampling technique is used to sample a triplet of an anchor image, a positive image, and a negative image.

Embodiments of the present disclosure may be used in the context of image search and image retrieval. For example, an information retrieval system based on the present disclosure may be used to generate a scene graph embedding corresponding to a query image and performs image retrieval based on the scene graph embedding. An example application in the image retrieval context is provided with reference to FIGS. 1-5. Details regarding the architecture of an example image processing apparatus are provided with reference to FIGS. 6-7. Examples of a process for training an image processing network are provided with reference to FIGS. 10-12.

Information Retrieval System

FIG. 1 shows an example of an image retrieval system according to aspects of the present disclosure. The example shown includes user 100, user device 105, image processing apparatus 110, cloud 115, and database 120.

In the example of FIG. 1, both the query and the search objects are images. However, other types of queries and search objects may be used. In some examples, the query is of a different media type than the search objects. For example, the query can be a natural language query and the search objects can be images. In some examples, the search objects themselves include different media types (e.g., image files, text files).

The user 100 communicates with the image processing apparatus 110 via the user device 105 and the cloud 115. For example, the user 100 may provide a query object such as an image query. In the example illustrated in FIG. 1, the image query is an image representing a natural landscape. The user device 105 transmits the image query to the image processing apparatus 110 to find related objects or information (i.e., search objects stored within the database 120). In some examples, the user device 105 communicates with the image processing apparatus 110 via the cloud 115.

In an example, the image query includes a set of objects (e.g., mountains, sun, etc.). The image processing apparatus 110 generates a scene graph of the image query, including one or more nodes representing a set of objects and one or more edges representing a relationship between two of the objects. The image processing apparatus 110 generates a scene graph embedding based on the scene graph. The image processing apparatus 110 assigns metadata to the image query based on the scene graph embedding (e.g., values from the scene graph embedding that can be used to index the image for searching). The image processing apparatus 110 compares the metadata to metadata associated with each of the search objects stored in database 120. The database 120 returns one or more images related to the metadata. The matching images are presented to the user 100. The process of using the image processing apparatus 110 to perform image search and image retrieval is further described with reference to FIG. 2.

Prior to performing the search, the image processing apparatus 110 may be trained and then used to embed the search objects and query objects in a common embedding space in which each of the objects is represented as a scene graph embedding. In some cases, each of the query objects is assigned metadata based on the corresponding scene graph embedding.

The user device 105 may be a personal computer, laptop computer, mainframe computer, palmtop computer, personal assistant, mobile device, or any other suitable processing apparatus. In some examples, the user device 105 includes software that incorporates an image search application (e.g., a search engine). The image search application may either include or communicate with the image processing apparatus 110. Alternatively or additionally, the user device 105 includes a user interface so that a user 100 can upload an image query via the user interface.

Image processing apparatus 110 includes a computer implemented network comprising a search component, a scene graph generator, a word embedding component, a GCN, and a metadata component. The network identifies an image including a set of objects. The network generates a scene graph of the image including a node representing an object and an edge representing a relationship between two of the objects. The network generates a node vector for the node, where the node vector represents semantic information of the object. The network generates an edge vector for the edge, where the edge vector represents semantic information of the relationship. The network generates a scene graph embedding based on the node vector and the edge vector using a GCN. The network assigns metadata to the image based on the scene graph embedding.

A scene graph is a structural representation of content of an image. Scene graphs capture objects of the image and relational or spatial information between objects. In some cases, scene graphs can be trained with supervision for intermediate representations. Alternatively, scene graphs are aligned with pre-trained image features using neural networks for a joint representation of scene graphs and images. The term scene graph embedding may correspond to high-dimensional representation of an image, e.g., created using a GCN. The term metadata may refer to indexing information assigned to a query object and search objects for purpose of information retrieval. In some examples, a search engine is able to compare metadata of a query object (e.g., an image query) against corresponding metadata of each of the search objects stored in a database. In some cases, the image query is a search query received from a user. The image query is also referred to as a query image. The search engine then returns one or more search objects based on the comparison.

Image processing apparatus 110 may also include a processor unit, a memory unit, and a training component. Additionally, image processing apparatus 110 can communicate with the database 120 via the cloud 115. In some cases, the architecture of the image processing network is also referred to as a network model or a network. Further detail regarding the architecture of image processing apparatus 110 is provided with reference to FIGS. 6-7. Further detail regarding a process for image processing is provided with reference to FIGS. 8-9. Further detail regarding the training of image processing apparatus 110 is provided with reference to FIGS. 10-12.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction. Database 120 is an example of, or includes aspects of, the corresponding element described with reference to FIG. 3.

Figure 2:
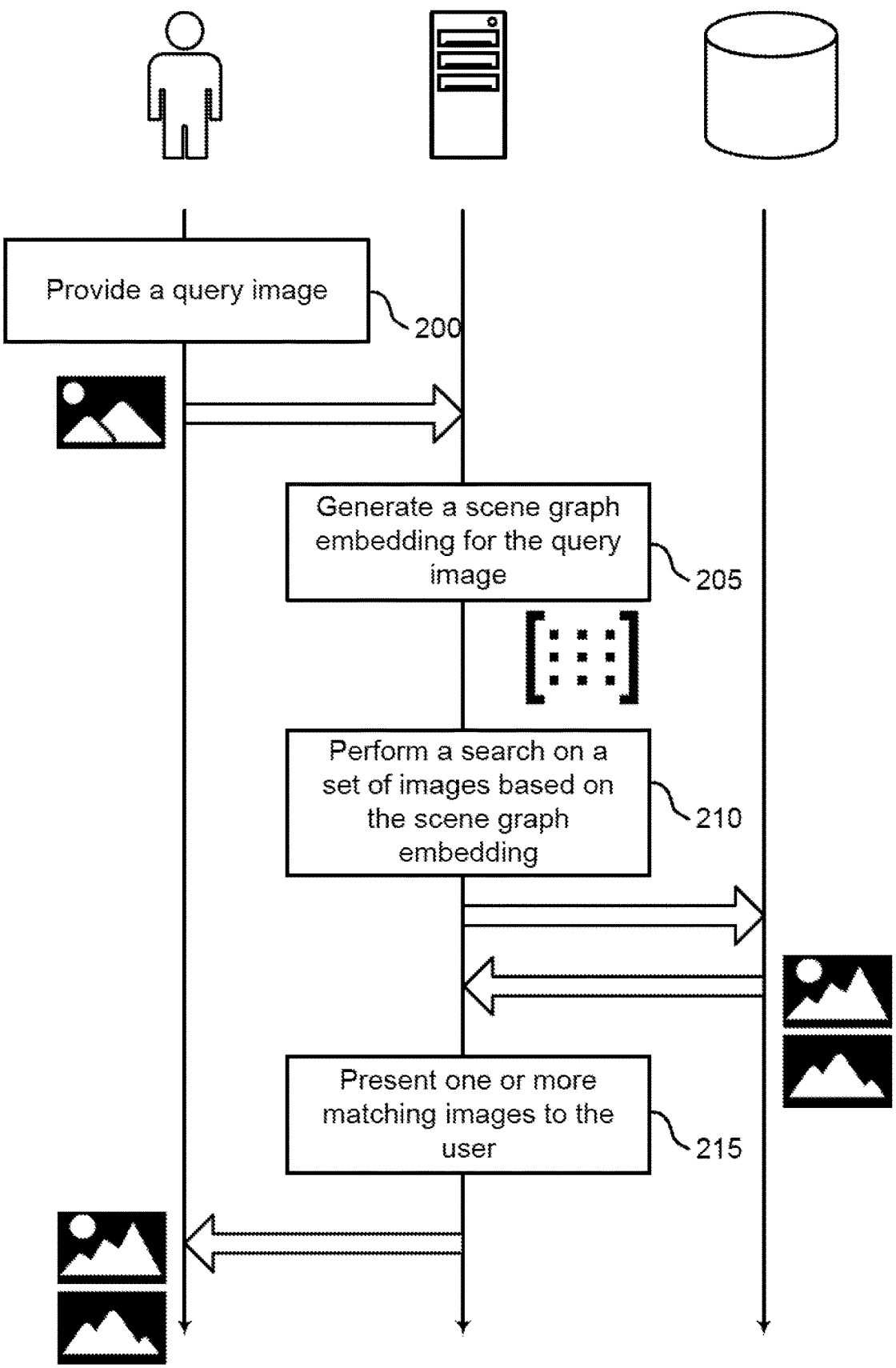
FIG. 2 shows an example of a process for image retrieval according to aspects of the present disclosure.

FIG. 2 shows an example of a process for image retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides a query image. According to an example, the query image includes a natural landscape (e.g., the query image includes the sun and mountains). In some cases, the query image is also referred to as a search image. The query image shown herein is for illustrative purpose. However, in practice, a query image may be more complex including more objects and relationships between the objects. Furthermore, embodiments of the present disclosure are not limited to image queries. In some cases, the query object can be an image file, natural language text, text file or any combination of thereof. In some cases, the operations of this step refer to, or may be performed by, a user as described with reference to FIG. 1.

At operation 205, the system generates a scene graph embedding for the query image. In some cases, the operations of this step refer to, or may be performed by, an image processing apparatus as described with reference to FIG. 1.

In some examples, the system generates a scene graph of the query image prior to the embedding stage. Scene graphs are used to close or reduce the semantic gap between low-level visual features and high-level concepts in image retrieval tasks. The system includes a neural network model (e.g., an image processing network) to process the scene graph into a visual-semantic embedding space for images, i.e., scene graph embeddings.

At operation 210, the system performs a search on a set of images based on the scene graph embedding. In some cases, the operations of this step refer to, or may be performed by, an image processing apparatus as described with reference to FIG. 1.

According to an embodiment, the system generates a scene graph embedding for each of a set of images stored in the database (i.e., during an offline embedding period prior to the search, as described in FIG. 1). The respective scene graph embedding for each image is also stored in the database. In some examples, a scene graph query is used to run a nearest neighbor search over embeddings of the indexed images.

The system performs content-based image retrieval, i.e., searches related images based on information provided in the query image (e.g., colors, shapes, etc.). For example, a user may apply quantitative approaches to the data of a given image and query a database to obtain visually similar images. Images that comprise multiple objects and high-order concepts (i.e., complex images) utilize structured representation of images (e.g., scene graphs) to capture scene semantics in a structured format. Scene graph embeddings are obtained from scene graphs and the scene graph embeddings capture information of a scene and exploit structured representations and continuous intermediate representations.

At operation 215, the system retrieves one or more matching images from a database and presents the matching images to the user. The user is able to view the matching images presented. The user can choose to refine the search results by running an additional search (i.e., by selecting an image from the search results and using the selected image as a new search query). In some cases, the operations of this step refer to, or may be performed by, a user interface implemented on a user device as described with reference to FIG. 1.

Figure 3:
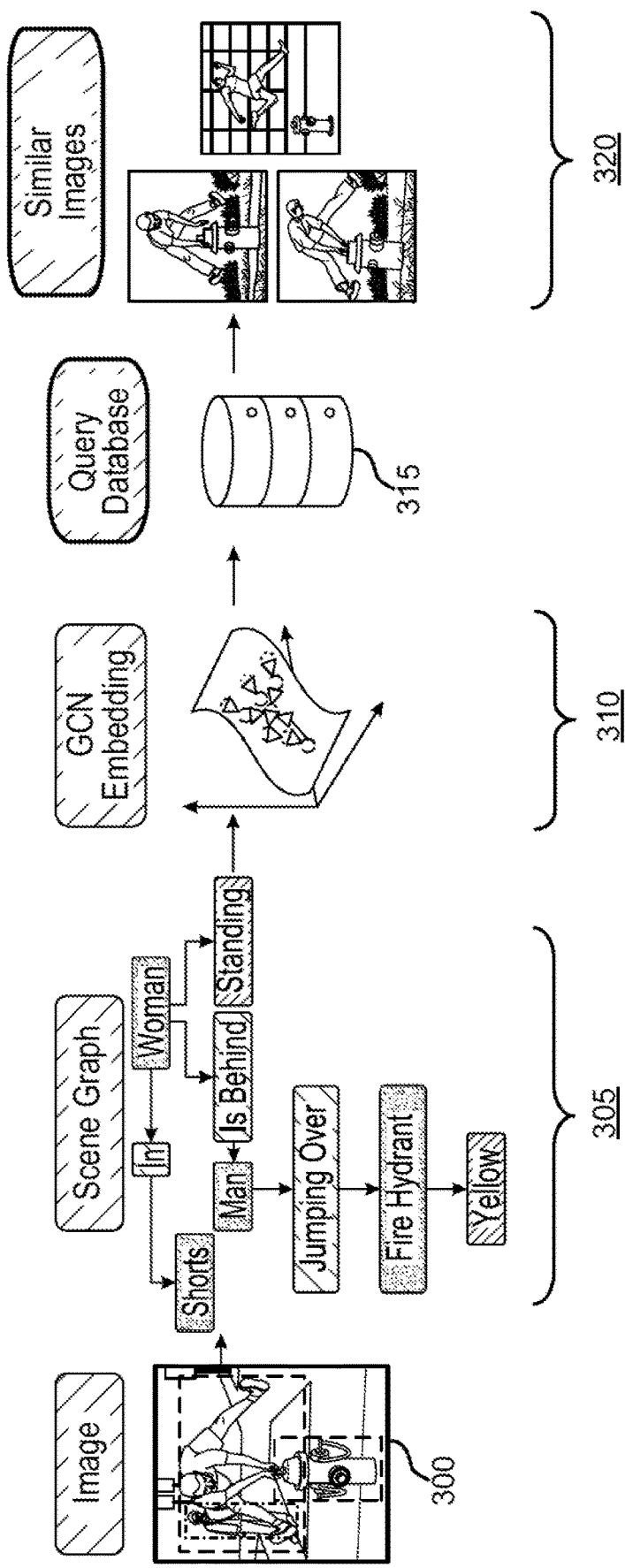
FIG. 3 shows an example of a process for image retrieval based on a query image according to aspects of the present disclosure.

FIG. 3 shows an example of a process for image retrieval based on a query image according to aspects of the present disclosure. The example shown includes query image 300, scene graph 305, scene graph embedding 310, database 315, and similar images 320.

In some examples, query image 300 is an image input to the image processing apparatus as described in FIG. 1. Query image 300 is an example of, or includes aspects of, the corresponding element described with reference to FIG. 5. Given an input query image 300, the image processing apparatus first generates its scene graph 305 which contains the object and relationships present in the input query image 300. Scene graph 305 is an example of, or includes aspects of, the corresponding element described with reference to FIG. 4. As the example in FIG. 3, the query image 300 includes a first person jumping over a fire hydrant and a second person standing behind the first person. The scene graph 305, however, is able to capture these objects and their relationships. The scene graph 305 indicates objects, attributes, relationships, etc. They are marked by different filling patterns (refer to legend used in FIG. 4). The scene graph 305 captures high-level information and concepts in the query image 300, i.e., a woman is behind a man. The man is jumping over a fire hydrant.

In some examples, scene graph 305 is then passed through a graph convolutional network, which condenses the scene graph into a fixed-dimension embedding. The embedding is also referred to as a scene graph embedding 310. Finally, the scene graph embedding 310 is used to retrieve other similar images using a nearest neighbor search over an image database 315. Database 315 is an example of, or includes aspects of, the corresponding element described with reference to FIG. 1. In an embodiment, a GCN architecture is used to encode or embed scene graphs 305 into scene graph embeddings 310. An image processing network is trained using relative similarity labels.

Figure 4:
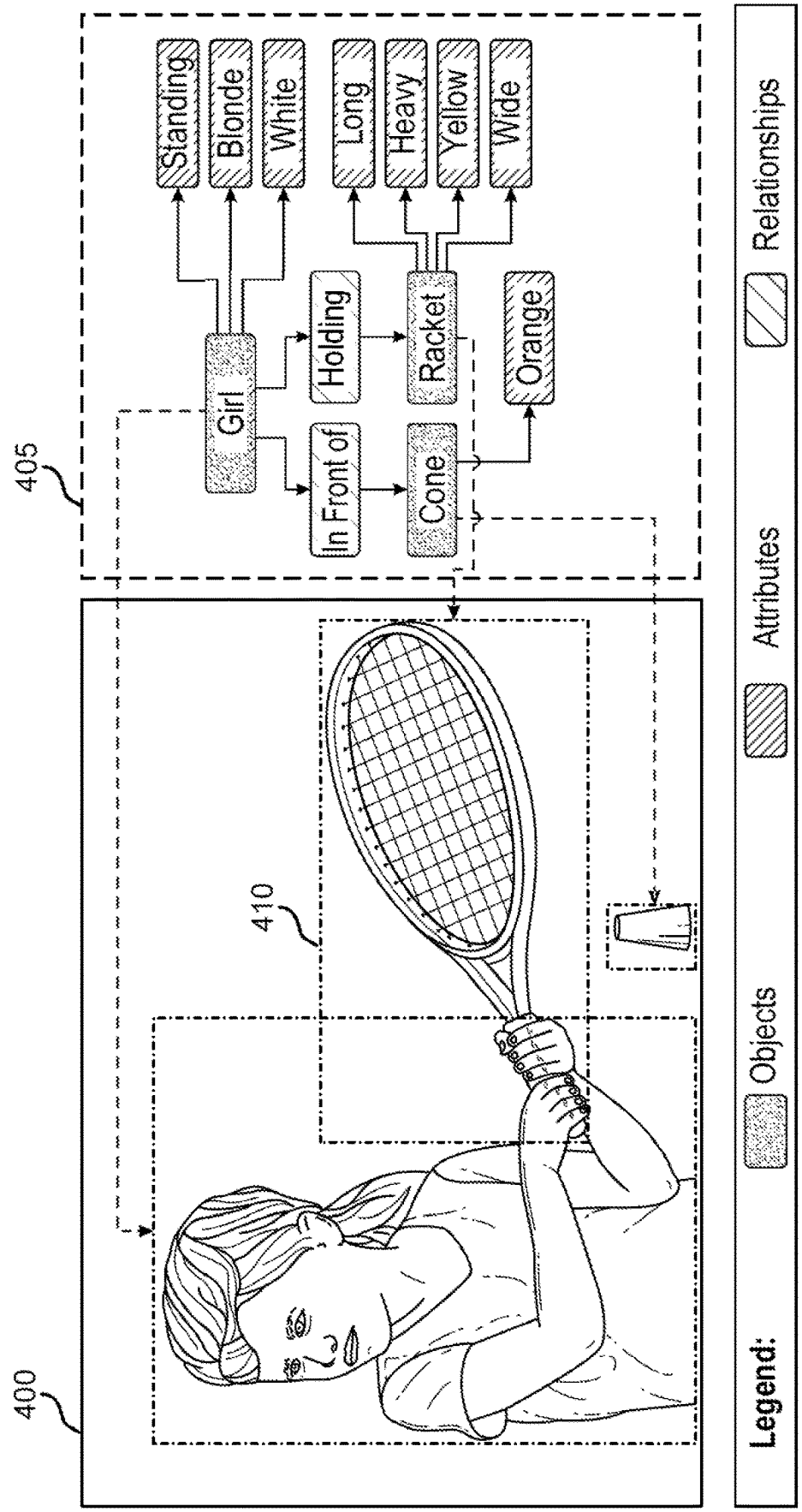
FIG. 4 shows an example of a scene graph representation of an image according to aspects of the present disclosure.

FIG. 4 shows an example of a scene graph 405 representation of an image 400 according to aspects of the present disclosure. The example shown includes image 400, scene graph 405, and object 410. Scene graph 405 is placed on the right-hand side of FIG. 4. Arrows are used to point to objects 410 in the image 400. Image 400 may include multiple objects 410. As an example, image 400 shows a blond girl holding a racket. The racket is one example of objects 410. Here, girl and racket are also identified as objects 410. "Holding" shows a relationship between the girl and the racket. "Blonde" is an attribute associated with the girl.

In some embodiments, the image processing apparatus leverages structured representations of images (i.e., scene graphs 405). Scene graphs 405 concisely summarize the semantics of the scene in the image, with the nodes corresponding to objects in the image, and edges denoting the relationship between them. One or more embodiments learn semantic image representations using scene graphs 405 as input. Scene graph 405 is an example of, or includes aspects of, the corresponding element described with reference to FIG. 3.

In some cases, scene graphs 405 are used as a representation of the underlying content of images. Scene graphs 405 encapsulate the constituent objects and their relationships, and encode object attributes and spatial information. Scene graphs 405 can be applied to multiple downstream applications (for example, visual question answering, scene classification, image manipulation and visual relationship detection).

In some cases, scene graphs 405 are grounded into images to obtain the likelihood of the scene graph-image pair in the context of image retrieval. As an alternative, distributed representations derived from scene graphs 405 of images are utilized along with standard measures of similarity (e.g., cosine similarity or inner product). Embeddings derived from the scene graphs capture the information present in the scene of an image. Scene graph embeddings exploits structured representations such as graphs and continuous intermediate representations. The similarity search over these embeddings captures the overall or global context of the scene, different from visual similarity adopted in conventional image processing systems.

Figure 5:
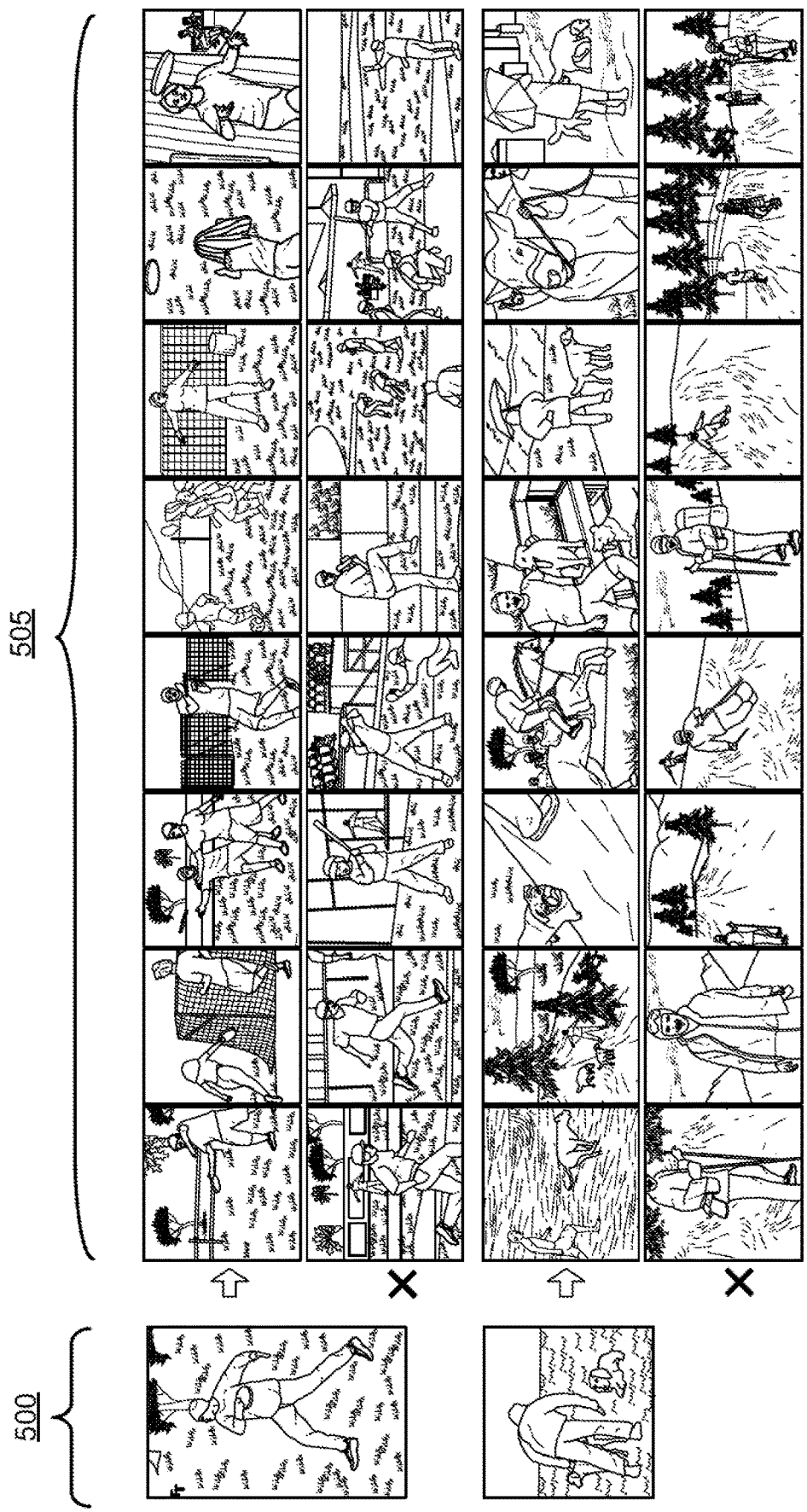
FIG. 5 shows an example of a comparison of image retrieval results based on a query image according to aspects of the present disclosure.

FIG. 5 shows an example of a comparison of image retrieval results based on a query image according to aspects of the present disclosure. The example shown includes query image 500 and retrieved images 505.

FIG. 5 illustrates how results from embodiments of the present disclosure differ from existing retrieval systems using conventional classification-based features. On the left, there are two example queries (i.e., query image 500). The first query image 500 shows a man throwing frisbee. The second query image 500 shows a man playing with dog. The first row (having top eight retrieved images 505) associated with the first query image show results retrieved using scene graph embeddings as described in the present disclosure. The second row (having top eight retrieved images 505) associated with the first query image 500 is retrieved using classification features in conventional image processing systems. A same setup applies to the second query image 500 towards the bottom of FIG. 5.

The corresponding similar images are shown on the right-hand side of FIG. 5 (retrieved images 505). Top eight retrieved images 505 are included in this example. It is observed that classification features retrieve visually similar images, while scene graph embeddings can capture the global structure of the scene in the query image, that is, "man throwing frisbee" and "man playing with dog", respectively. Classification features do not distinguish between different outdoor sports in the first example and fail to depict the human-animal interaction in the second example.

In some other examples, a query image includes a toaster. Retrieval results using the scene graph embeddings for the query image show that the image processing apparatus is able to retrieve images of a kitchen while the query only contains a toaster. This can be attributed to the GCN framework which captures object co-occurrences in the scene graphs. The embeddings capture the global context of another query image—people sitting on a bench in an outdoor setting—while also providing visual diversity. The embeddings capture higher order concepts and thus can be used effectively for content-based image retrieval.

One or more embodiments of the present disclosure learn from relative similarity labels in a ranking context, which is different from classification-centric supervision available for learning image representations.

Network Architecture

Figure 6:
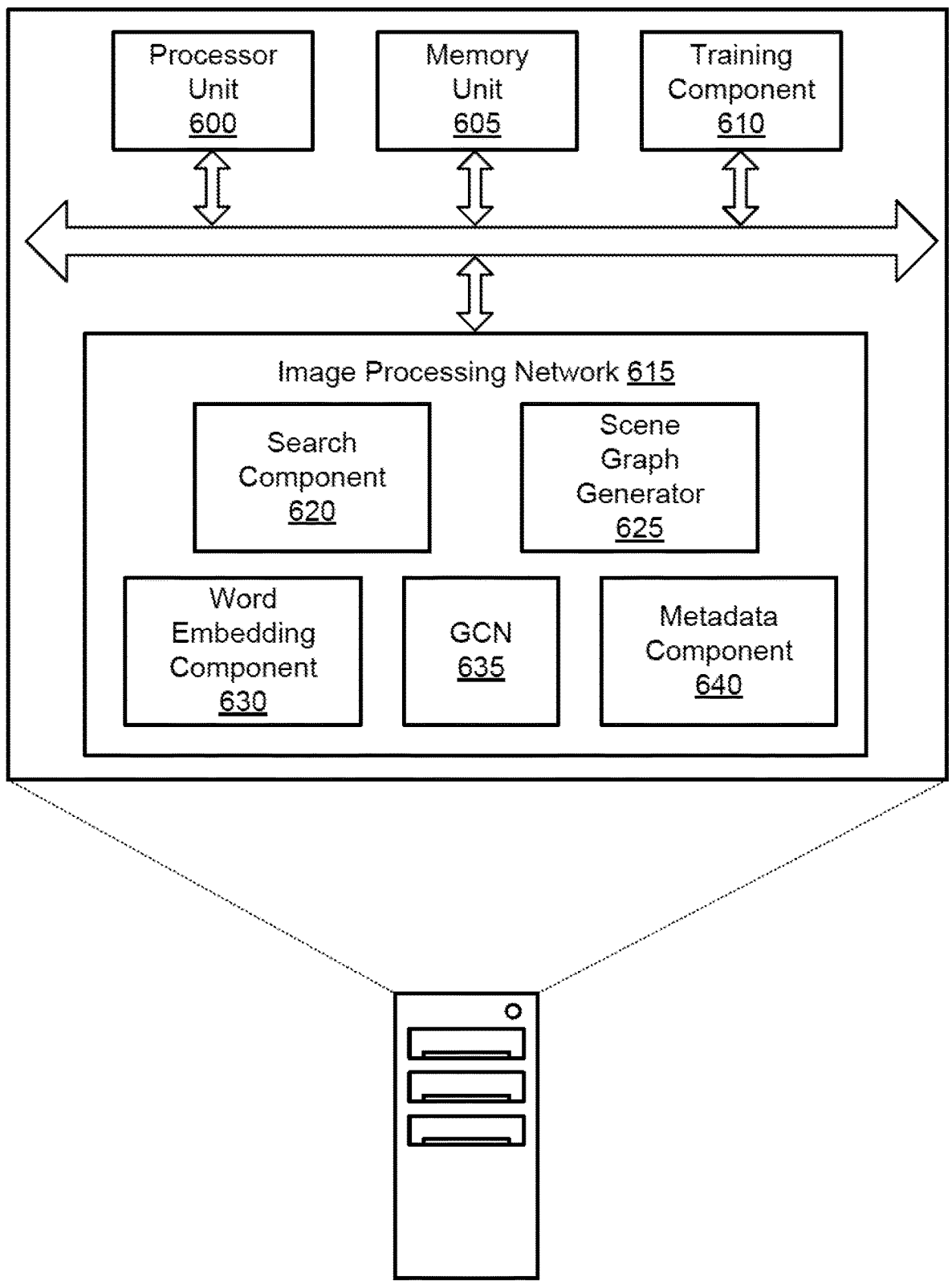
FIG. 6 shows an example of an image retrieval apparatus according to aspects of the present disclosure.
Figure 7:
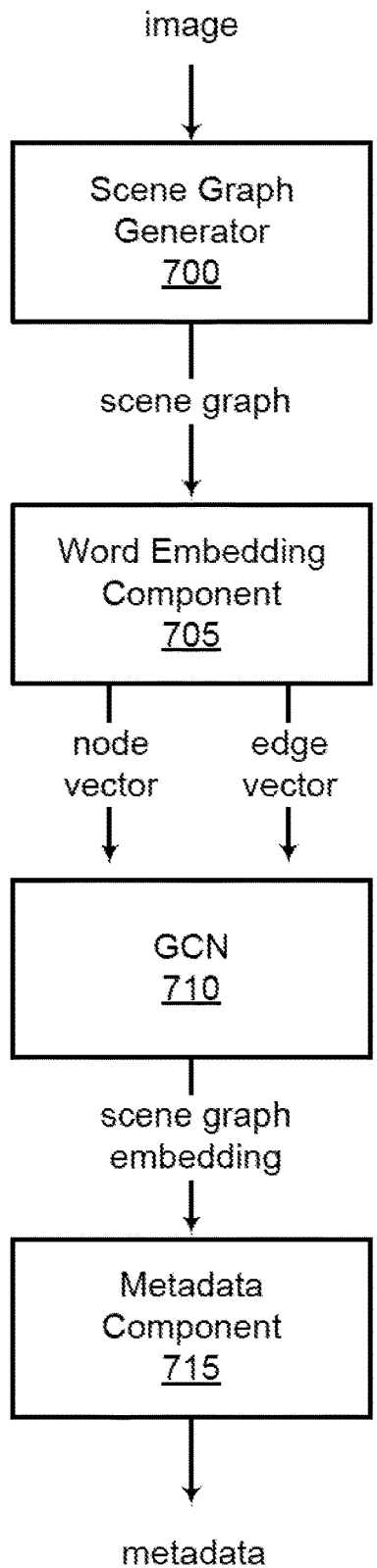
FIG. 7 shows an example of an image retrieval network according to aspects of the present disclosure.

In FIGS. 6-7, an apparatus and method for information retrieval are described. One or more embodiments of the apparatus and method include a scene graph generator configured to generate a scene graph of an image comprising a node representing an object and an edge representing a relationship between two of the objects, a word embedding component configured to generate a node vector for the node, wherein the node vector represents semantic information of the object and an edge vector for the edge, and wherein the edge vector represents semantic information of the relationship, and a GCN configured to generate a scene graph embedding based on the node vector and the edge vector.

Some examples of the apparatus and method further include a metadata component configured to assign metadata to the image based on the scene graph embedding. Some examples of the apparatus and method further include a search component configured to receive a search query from a user, and retrieve the image from a database based on the search query.

In some examples, the GCN comprises a plurality of convolution layers, wherein each of the convolution layers is configured to update the node vector and the edge vector. Some examples of the apparatus and method further include an aggregation layer configured to combine the updated node vector and the updated edge vector to produce the scene graph embedding.

FIG. 6 shows an example of an image retrieval apparatus according to aspects of the present disclosure. The example shown includes processor unit 600, memory unit 605, training component 610, and image processing network 615.

A processor unit 600 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 600 is configured to operate a memory array using a memory controller. In other cases, a memory controller is integrated into the processor. In some cases, the processor unit 600 is configured to execute computer-readable instructions stored in a memory to perform various functions. In some embodiments, a processor unit 600 includes special purpose components for modem processing, baseband processing, digital signal processing, or transmission processing.

Examples of a memory unit 605 include random access memory (RAM), read-only memory (ROM), or a hard disk. Examples of memory unit 605 include solid state memory and a hard disk drive. In some examples, a memory unit 605 is used to store computer-readable, computer-executable software including instructions that, when executed, cause a processor to perform various functions described herein. In some cases, the memory unit 605 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 605 store information in the form of a logical state.

According to some embodiments of the present disclosure, the image processing apparatus includes a computer implemented artificial neural network (ANN) that generates a scene graph embedding based on a scene graph of a search image. The image processing apparatus assigns metadata to an image based on the scene graph embedding and performs similarity search and/or information retrieval. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments of the present disclosure, the image processing apparatus includes a graph convolutional network (GCN), which generates a scene graph embedding based on a node vector and an edge vector. GCN is a type of neural network that defines convolutional operation on graphs and uses their structural information. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for aspect terms and search for sentiment polarity of an input phrase/sentence.

In some embodiments, the image processing apparatus includes a word embedding component used to generate a node vector for a node and an edge vector for an edge. A word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

According to some embodiments, training component 610 identifies training data including a set of images and similarity information for pairs of the images. In some examples, training component 610 computes a ranking loss function based on the scene graph embedding and the similarity information. In some examples, training component 610 trains the GCN 635 based on the ranking loss function.

In some examples, training component 610 identifies a positive sample and a negative sample for the image from the training data, where the ranking loss function is based on the positive sample and the negative sample. Training component 610 identifies a first similarity value between the image and the positive sample from the similarity information. Subsequently, training component 610 identifies a second similarity value between the image and the negative sample from the similarity information. Training component 610 then computes a probability that the first similarity value is greater than the second similarity value.

In some examples, training component 610 computes a first posterior similarity value based on an inner product of the positive scene graph embedding and the scene graph embedding. Subsequently, training component 610 computes a second posterior similarity value based on an inner product of the negative scene graph embedding and the scene graph embedding. Training component 610 then computes a posterior probability that the first posterior similarity value is greater than the second posterior similarity value, where the ranking loss function is based on the posterior probability. In some examples, training component 610 selects the positive sample and the negative sample based on a uniform random sampling from a set of correctly-ordered pairs of the images. In some examples, training component 610 selects a most similar image to the image as the positive sample. In some examples, training component 610 selects a least similar image to the image as the negative sample.

In some examples, training component 610 selects the positive sample and the negative sample based on a non-uniform sampling, where the non-uniform sampling is based on the similarity information. In some examples, training component 610 rejects incorrectly ordered samples, where the positive sample and the negative sample are selected from a set of remaining samples after rejecting the incorrectly ordered samples. In some examples, the ranking loss function includes a contrastive learning loss.

In one embodiment, image processing network 615 includes search component 620, scene graph generator 625, word embedding component 630, GCN 635, and metadata component 640. Search component 620 retrieves the image from the database based on the metadata. In some examples, search component 620 receives a search query from a user. Search component 620 generates a query embedding for the search query. Subsequently, search component 620 identifies the image based on a similarity between the query embedding and the scene graph embedding. Search component 620 then displays the image to the user. According to some embodiments, search component 620 is configured to receive a search query from a user, and retrieve the image from a database based on the search query.

According to some embodiments, scene graph generator 625 generates a scene graph of the image including a node representing an object and an edge representing a relationship between two of the objects. In some examples, scene graph generator 625 creates a dummy node. Additionally, scene graph generator 625 creates a dummy edge for each node of the scene graph, where the dummy edge connects the dummy node to a corresponding node of the scene graph.

According to some embodiments, scene graph generator 625 generates a scene graph of an image in the training data. Scene graph generator 625 is an example of, or includes aspects of, the corresponding element described with reference to FIG. 7.

According to some embodiments, word embedding component 630 generates a node vector for the node, where the node vector represents semantic information of the object. In some examples, word embedding component 630 generates an edge vector for the edge, where the edge vector represents semantic information of the relationship. Word embedding component 630 is an example of, or includes aspects of, the corresponding element described with reference to FIG. 7.

According to some embodiments, GCN 635 generates a scene graph embedding based on the node vector and the edge vector. In some examples, GCN 635 updates the edge vector based on a source node and a target node. GCN 635 then updates the node vector based on an incoming edge or an outgoing edge. In some examples, the scene graph embedding is based on the updated edge vector and the updated node vector. In some examples, the GCN 635 includes a set of convolution layers, where each of the convolution layers is configured to update the node vector and the edge vector.

According to some embodiments, GCN 635 generates a scene graph embedding based on the scene graph. In some examples, GCN 635 generates a positive scene graph embedding for the positive sample. GCN 635 generates a negative scene graph embedding for the negative sample. GCN 635 is an example of, or includes aspects of, the corresponding element described with reference to FIG. 7.

According to some embodiments, metadata component 640 assigns metadata to the image based on the scene graph embedding. In some examples, metadata component 640 stores the image in a database together with the metadata. Metadata component 640 is an example of, or includes aspects of, the corresponding element described with reference to FIG. 7.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 7 shows an example of an image retrieval network according to aspects of the present disclosure. The example shown includes scene graph generator 700, word embedding component 705, GCN 710, and metadata component 715.

From top to bottom as illustrated in FIG. 7, an image is input to a scene graph generator 700 to produce a scene graph. The scene graph includes at least one node representing an object and at least one edge representing a relationship between two objects. Scene graph generator 700 is an example of, or includes aspects of, the corresponding element described with reference to FIG. 6. The scene graph is then fed into a word embedding component 705. Word embedding component 705 is an example of, or includes aspects of, the corresponding element described with reference to FIG. 6. Word embedding component 705 generates a node vector for the node. The node vector represents semantic information of the object. Word embedding component 705 also generates an edge vector for the edge, and the edge vector represents semantic information of the relationship. The node vector and the edge vector are input to GCN 710 to produce a scene graph embedding. GCN 710 is an example of, or includes aspects of, the corresponding element described with reference to FIG. 6. The scene graph embedding is then input to metadata component 715 to produce metadata. Metadata component 715 is an example of, or includes aspects of, the corresponding element described with reference to FIG. 6.

In some embodiments of the present disclosure, a neural network model (i.e., an image processing network) is trained to learn image embeddings from a structured representation of the content. Each image has a corresponding scene graph, where the vertices represent objects and directed edges denote the relationships between them. In some examples, a scene graph includes triples such as <subject, predicate, object>. The image processing network is trained to learn a mapping from a scene graph to a scene graph embedding so that the scene graph embedding is the embedding of image. In some examples, the image processing network learns intermediate scene graph representations. In some embodiments, the mapping network is a graph convolutional network (GCN). GCN may be trained to learn intermediate scene graph representations. GCN performs a set of convolution operations on the graph, followed by an aggregation layer to pool context from different entities in the image.

Information Retrieval Using an Image Processing Network

Figure 8:
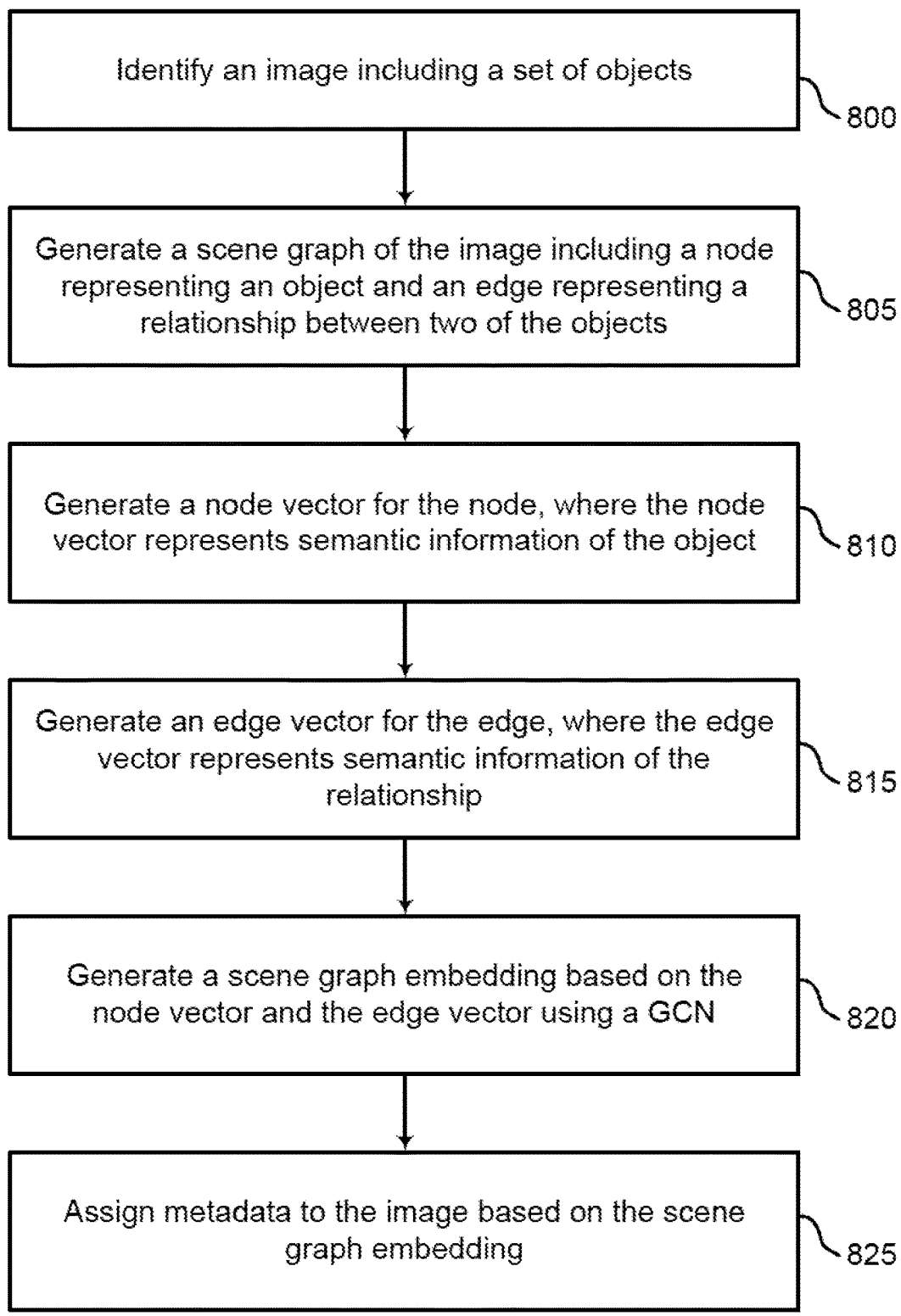
FIG. 8 shows an example of a process for image processing according to aspects of the present disclosure.
Figure 9:
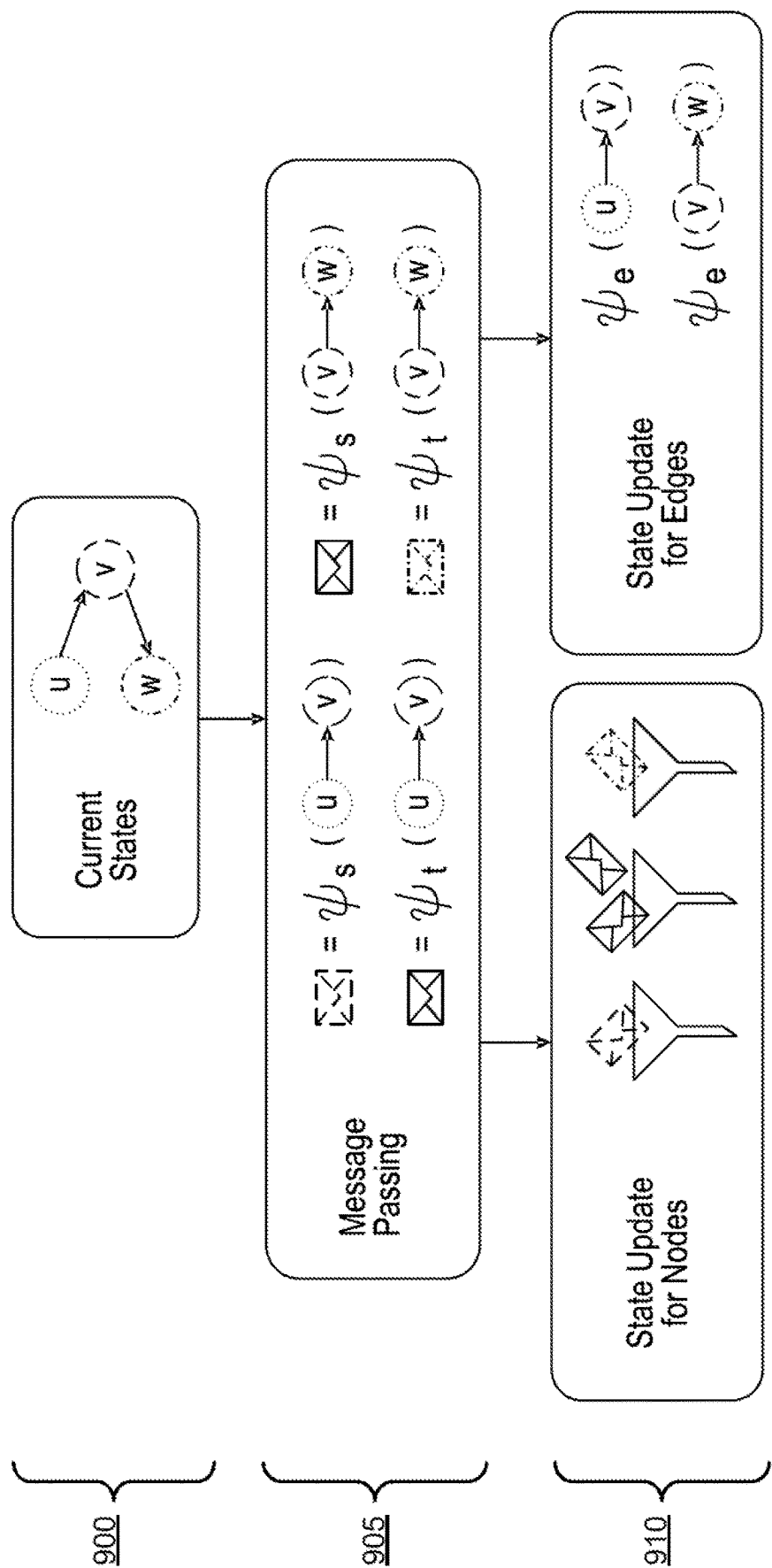
FIG. 9 shows an example of a process of updating an edge vector and a node vector using a graph convolutional layer according to aspects of the present disclosure.

In accordance with FIGS. 8-9, a method, apparatus, and non-transitory computer readable medium for information retrieval are described. One or more embodiments of the method, apparatus, and non-transitory computer readable medium include identifying an image comprising a plurality of objects, generating a scene graph of the image comprising a node representing an object and an edge representing a relationship between two of the objects, generating a node vector for the node, wherein the node vector represents semantic information of the object, generating an edge vector for the edge, wherein the edge vector represents semantic information of the relationship, generating a scene graph embedding based on the node vector and the edge vector using a graph convolutional network (GCN), and assigning metadata to the image based on the scene graph embedding.

Some examples of the method, apparatus, and non-transitory computer readable medium further include storing the image in a database together with the metadata. Some examples further include retrieving the image from the database based on the metadata.

Some examples of the method, apparatus, and non-transitory computer readable medium further include receiving a search query from a user. Some examples further include generating a query embedding for the search query. Some examples further include identifying the image based on a similarity between the query embedding and the scene graph embedding. Some examples further include displaying the image to the user.

Some examples of the method, apparatus, and non-transitory computer readable medium further include updating the edge vector based on a source node and a target node. Some examples further include updating the node vector based on an incoming edge or an outgoing edge. In some examples, the scene graph embedding is based on the updated edge vector and the updated node vector.

Some examples of the method, apparatus, and non-transitory computer readable medium further include computing an average of updated node vectors for each node of the scene graph, wherein the scene graph embedding is based on the average.

Some examples of the method, apparatus, and non-transitory computer readable medium further include creating a dummy node. Some examples further include creating a dummy edge for each node of the scene graph, wherein the dummy edge connects the dummy node to a corresponding node of the scene graph.

FIG. 8 shows an example of a process for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies an image including a set of objects. In some cases, the operations of this step refer to, or may be performed by, an image processing apparatus as described with reference to FIG. 1.

In some embodiments, the system includes a neural network model (i.e., an image processing network). The trained image processing network generates image embeddings from a structured representation of the content. The structured representation is also referred to as a scene graph of the image, which will be described in more detail below.

At operation 805, the system generates a scene graph of the image including a node representing an object and an edge representing a relationship between two of the objects. In some cases, the operations of this step refer to, or may be performed by, a scene graph generator as described with reference to FIGS. 6 and 7.

Each image $\mathcal{I}$ has a corresponding scene graph $\mathcal{G}_\mathcal{I} = (V_\mathcal{I}, E_\mathcal{I})$, where the vertices $V_\mathcal{I}$ represent objects and directed edges $E_\mathcal{I}$ denote the relationships between them. Therefore, $\mathcal{G}_\mathcal{I}$ comprises of <subject, predicate, object> triples such as <cat, on, bed> or <man, driving, car>.

At operation 810, the system generates a node vector for the node, where the node vector represents semantic information of the object. In some cases, the operations of this step refer to, or may be performed by, a word embedding component as described with reference to FIGS. 6 and 7.

At operation 815, the system generates an edge vector for the edge, where the edge vector represents semantic information of the relationship. In some cases, the operations of this step refer to, or may be performed by, a word embedding component as described with reference to FIGS. 6 and 7.

At operation 820, the system generates a scene graph embedding based on the node vector and the edge vector using a GCN. In some cases, the operations of this step refer to, or may be performed by, a GCN as described with reference to FIGS. 6 and 7.

In an embodiment, the image processing network is trained to learn a mapping $\Phi$ as follows: $\mathcal{G}_J \rightarrow f_J$ where $f_J \in \mathbb{R}^D$ is the scene graph embedding of the image $J$. In some examples, the network model learns intermediate scene graph representations. In some embodiments, $\Phi$ is modeled as a graph convolutional network (GCN) (e.g., GCN may be used or trained to learn intermediate scene graph representations). The GCN mapping model $\Phi$ performs a series of convolution operations on the scene graph of the image $J$, followed by an aggregation layer to pool context from different entities in the image $J$.

At operation 825, the system assigns metadata to the image based on the scene graph embedding. For example, the metadata may include values from the scene graph embedding that can be used for indexing the image in a database. In some cases, metadata information for each of the search objects (i.e., other images) are stored in the database. Metadata of the image (e.g., a query image) is compared to metadata associated with each of the search objects stored in a database, for example. The system then runs a nearest neighbor search over the metadata of the image and the metadata of the search objects to retrieve one or more matching images. In some cases, the operations of this step refer to, or may be performed by, a metadata component as described with reference to FIGS. 6 and 7.

FIG. 9 shows an example of a process of updating an edge vector and a node vector using a graph convolutional layer according to aspects of the present disclosure. The example shown includes current state 900, message passing 905, status update 910.

Given an input image and the corresponding scene graph of the input image, an image processing apparatus first embeds all nodes and edges using word embeddings of the object and relationship classes. The image processing apparatus creates a scene graph which is then passed through multiple graph convolutional layers in series. The embedding vectors are updated based on their respective immediate neighborhoods. Finally, the embedding of the scene graph is obtained by pooling all the node representations. In some examples, the image processing apparatus may not consider the edges, because their information is already propagated to adjacent nodes by the GCN layers.

Each graph convolutional layer relays information via the edges. First, for each edge, a message is generated for both the source and target node of the edge. These messages contain information about the current edge state and the source and target states. This message generation, represented by $\psi_s$ and $\psi_t$, is done through fully connected networks. The next step involves updating each node and edge state. For the edges, the new state representation is obtained through another network $\psi_e$. Coming to the nodes, each node receives multiple messages from the incoming and outgoing edges, which are aggregated to update its representation. This is done by first pooling all the messages received at the node, passing through a fully connected network, and then normalizing to have a unit length vector. Therefore, a single GCN layer updates all the node and edge representations by pooling information from local neighborhoods. When this process is repeated iteratively through a stack of GCN layers, the resulting state vectors capture information from the entire scene graph. Details with respect to current state 900, message passing 905, status update 910 and corresponding mathematical formulations will be described next.

In an embodiment, each vertex u and edge $e_{uv}$ is encoded as a vector, $\Lambda_u \in \mathbb{R}^d$ and $\Lambda_{uv} \in \mathbb{R}^d$ respectively, using separate learnable embedding layers. These vectors are updated by convolution operations from their respective immediate neighborhoods. For nodes, this update step is a function of all the one-hop neighbor nodes and edge representations are updated based on a source node and a target node. Hence, the context is propagated throughout the graph via its edges. For example, each convolution layer of GCN relays information across entities by applying message passing 905 followed by status update 910 (i.e., state update for edges and then state update for nodes).

As illustrated in FIG. 9, message passing 905 is described as below. Each edge in the graph generates a "message" for its source and target nodes during message passing. For edge $e_{uv} \in E_J$, a message $m_{uv}^s \in \mathbb{R}^h$ is sent to the source node u and another message $m_{uv}^t \in \mathbb{R}^h$ is sent to the target node v. These messages gather information from the edge state $\Lambda_{uv}$ and the node states $\Lambda_u$ and $\Lambda_v$ and are denoted by:

$$m_{uv}^s \leftarrow \psi_s(\Lambda_u, \Lambda_v, \Lambda_{uv}) \quad (1)$$

$$m_{uv}^t \leftarrow \psi_t(\Lambda_u, \Lambda_v, \Lambda_{uv}) \quad (2)$$

Status update 910 includes state update for edges and state update for nodes. In an embodiment, state update for edges is formulated as the following. The state vector for an edge $\Lambda_{uv}$ is updated to $\hat{\Lambda}_{uv} \in \mathbb{R}^D$ by combining the most recent node states with the edge's prior state as:

$$\hat{\Lambda}_{uv} \leftarrow \psi_e(\Lambda_u, \Lambda_{uv}, \Lambda_v) \quad (3)$$

In an embodiment, state update for nodes include the following. The state for every node $\Lambda_u$ is updated to an intermediate representation which is obtained by pooling all the messages it receives via its edges:

$$\Gamma_u \leftarrow \frac{\sum_{w|(u,w) \in E_J} m_{uw}^s + \sum_{w|(w,u) \in E_J} m_{wu}^t}{\sum_{w|(u,w) \in E_J} 1 + \sum_{w|(w,u) \in E_J} 1} \quad (4)$$

This intermediate pooled representation is passed through another non-linear transformation and normalized to produce the updated node state $\hat{\Lambda}_u \in \mathbb{R}^D$ as:

$$\hat{\Lambda}_u \leftarrow \frac{\psi_n(\Gamma_u)}{\|\psi_n(\Gamma_u)\|_2} \quad (5)$$

$\ell_2$-normalization results in unit length vectors. The state vectors $\Lambda_u$ and $\Lambda_{uv}$ are iteratively updated via a series of graph convolution layers such that the resulting state vectors of nodes capture information from the entire graph. Finally, the embedding of the scene graph (and the image) is defined as the average over all learnt node state vectors:

$$f_J \leftarrow \frac{\sum_{u \in V_J} \hat{\Lambda}_u}{\sum_{u \in V_J} 1} \quad (6)$$

Non-linear transformations—$\psi_s$, $\psi_t$, $\psi_e$, $\psi_n$—are implemented as multi-layer perceptrons. According to an embodiment, a network is configured to model functions $\psi_s$, $\psi_t$, and $\psi_e$ where the network concatenates the inputs $\Lambda_u$, $\Lambda_{uv}$, $\Lambda_v$ and computes three outputs using separate fully connected heads. Weight sharing across all neighborhoods enables the layer to operate on graphs of arbitrary shapes. In an embodiment, a dummy node _image_ and dummy edges _in_image_ from every other node to this node are augmented to ensure that a scene graph is connected.

Training

Figure 10:
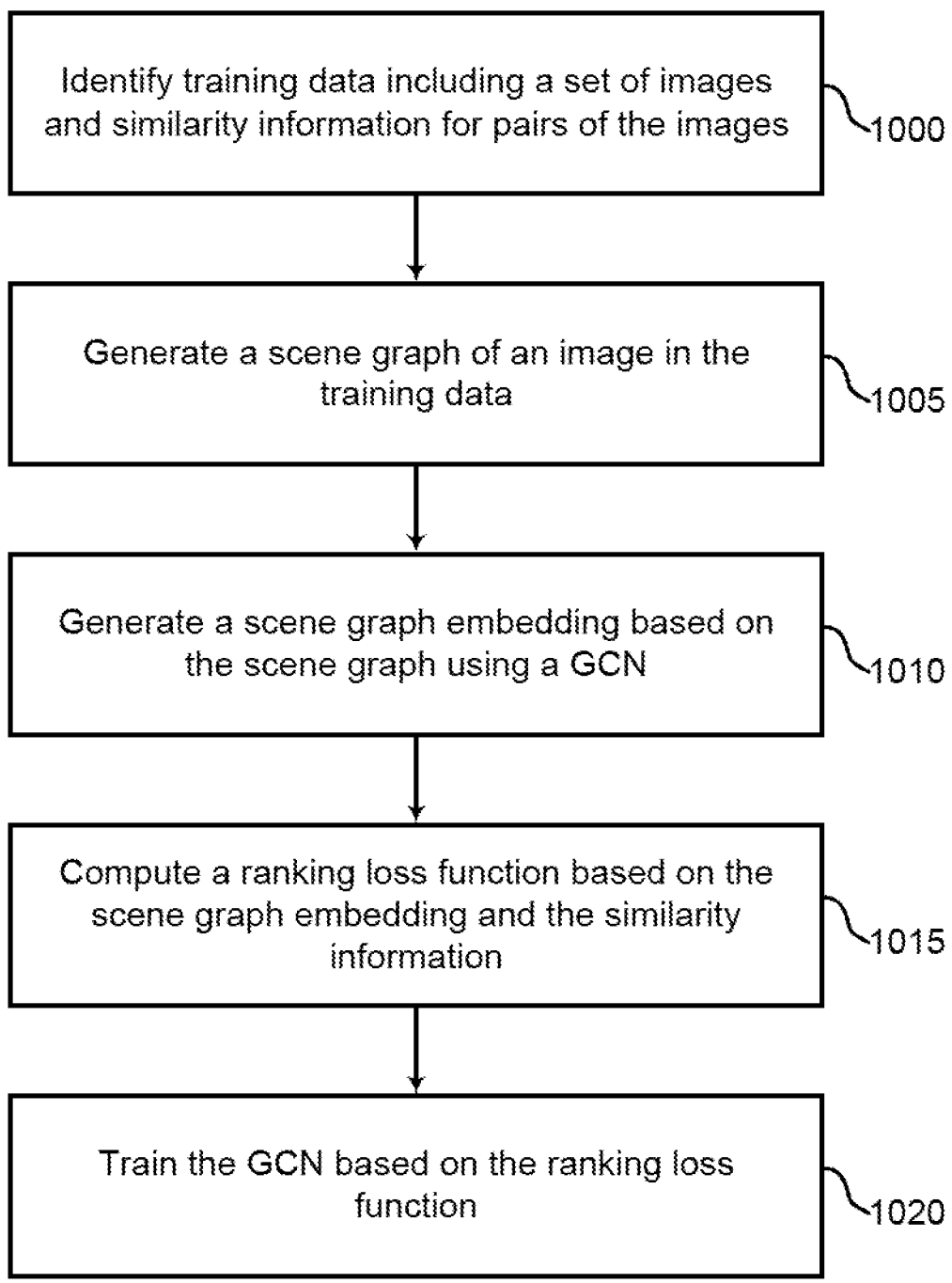
FIG. 10 shows an example of a process for training an image processing network according to aspects of the present disclosure.
Figure 11:
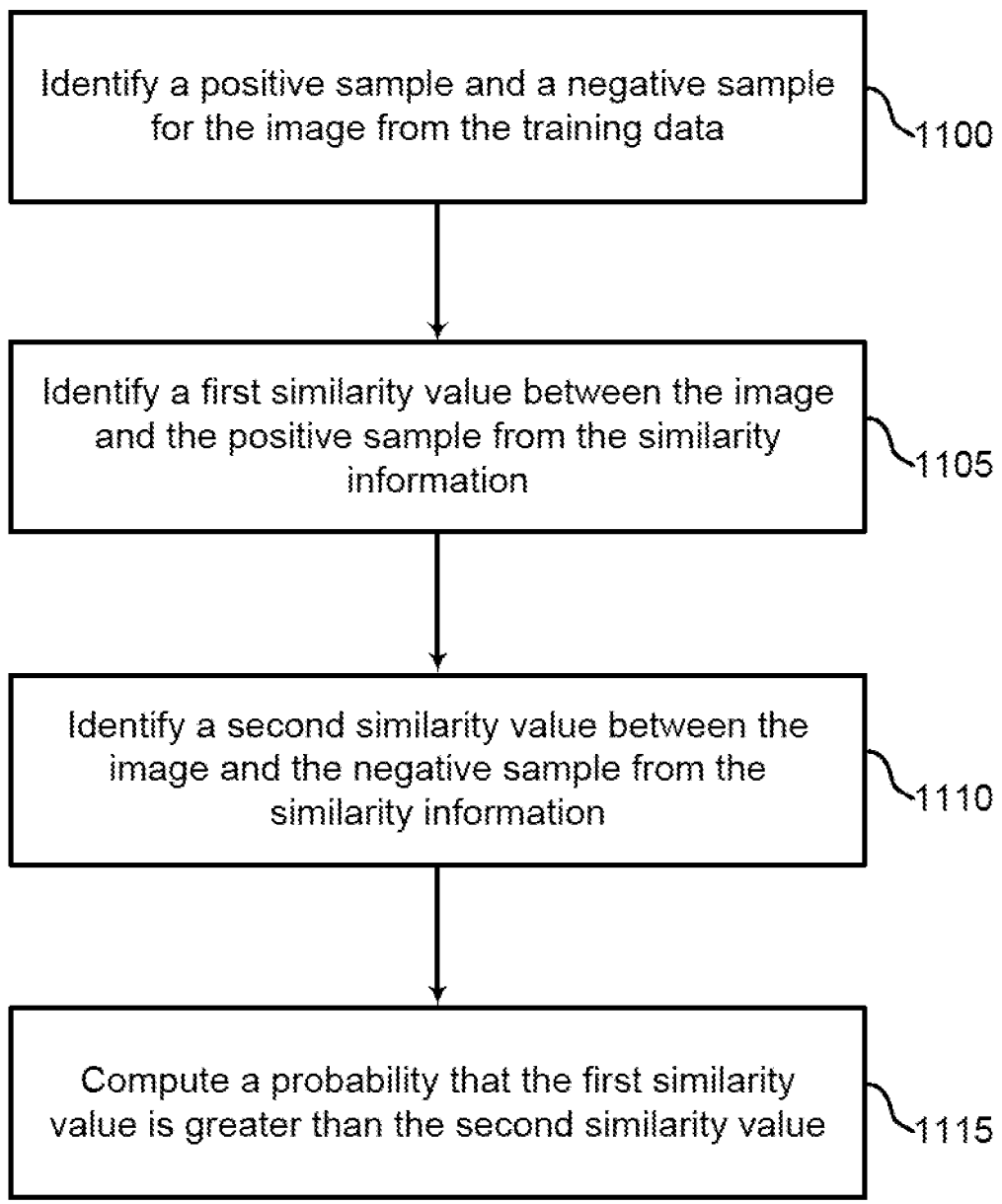
FIGS. 11 and 12 show examples of a process for training an image processing network based on a ranking loss function according to aspects of the present disclosure.
Figure 12:
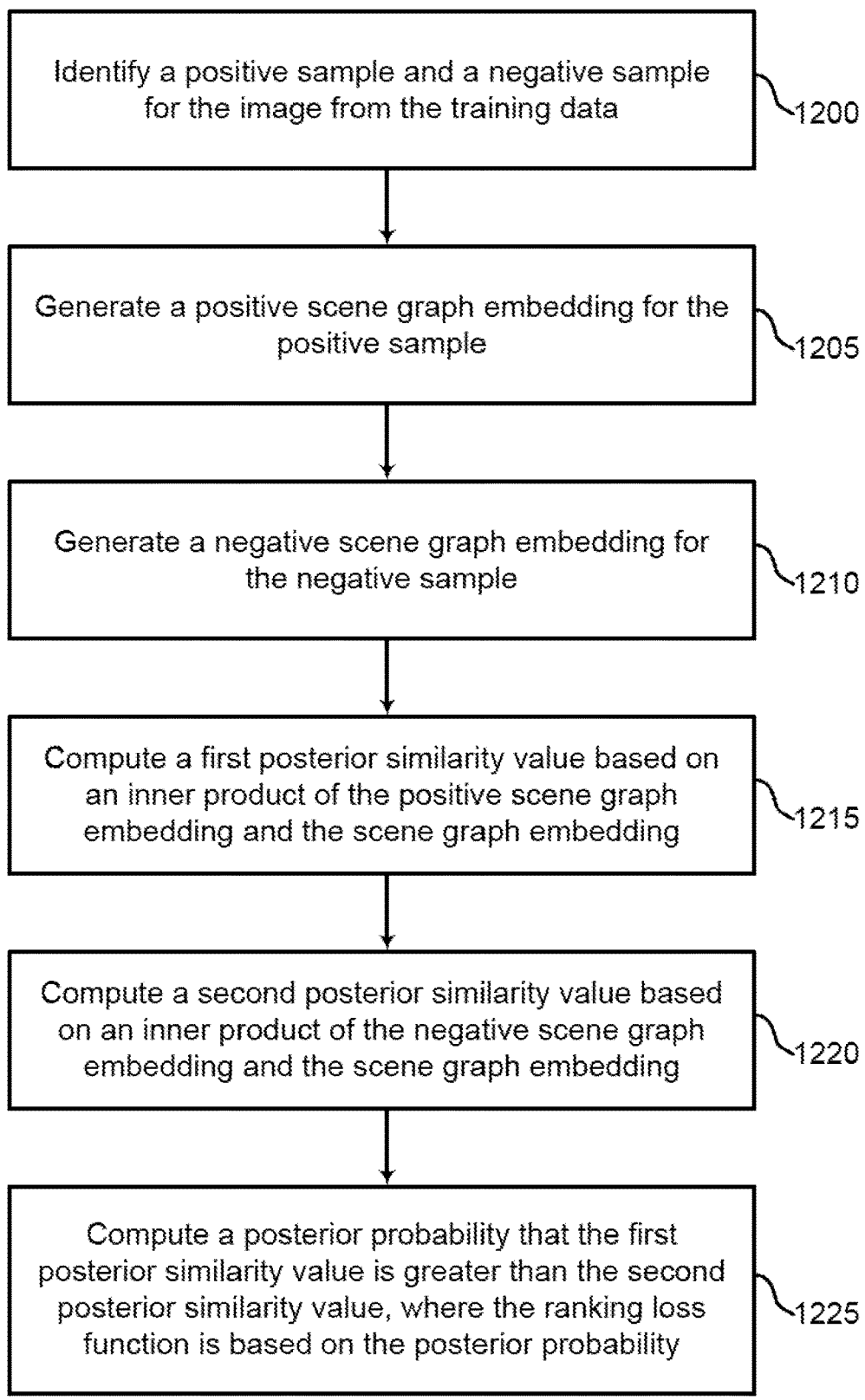

In accordance with FIGS. 10-12, a method, apparatus, and non-transitory computer readable medium for training a network are described. One or more embodiments of the method, apparatus, and non-transitory computer readable medium include identifying training data including a plurality of images and similarity information for pairs of the images, generating a scene graph of an image in the training data, generating a scene graph embedding based on the scene graph using a GCN, computing a ranking loss function based on the scene graph embedding and the similarity information, and training the GCN based on the ranking loss function.

Some examples of the method, apparatus, and non-transitory computer readable medium further include identifying a positive sample and a negative sample for the image from the training data, wherein the ranking loss function is based on the positive sample and the negative sample.

Some examples of the method, apparatus, and non-transitory computer readable medium further include identifying a first similarity value between the image and the positive sample from the similarity information. Some examples further include identifying a second similarity value between the image and the negative sample from the similarity information. Some examples further include computing a probability that the first similarity value is greater than the second similarity value.

Some examples of the method, apparatus, and non-transitory computer readable medium further include generating a positive scene graph embedding for the positive sample. Some examples further include generating a negative scene graph embedding for the negative sample. Some examples further include computing a first posterior similarity value based on an inner product of the positive scene graph embedding and the scene graph embedding. Some examples further include computing a second posterior similarity value based on an inner product of the negative scene graph embedding and the scene graph embedding. Some examples further include computing a posterior probability that the first posterior similarity value is greater than the second posterior similarity value, wherein the ranking loss function is based on the posterior probability.

Some examples of the method, apparatus, and non-transitory computer readable medium further include selecting the positive sample and the negative sample based on a uniform random sampling from a set of correctly-ordered pairs of the images.

Some examples of the method, apparatus, and non-transitory computer readable medium further include selecting a most similar image to the image as the positive sample. Some examples further include selecting a least similar image to the image as the negative sample.

Some examples of the method, apparatus, and non-transitory computer readable medium further include selecting the positive sample and the negative sample based on a non-uniform sampling, wherein the non-uniform sampling is based on the similarity information.

Some examples of the method, apparatus, and non-transitory computer readable medium further include rejecting incorrectly ordered samples, wherein the positive sample and the negative sample are selected from a set of remaining samples after rejecting the incorrectly ordered samples. In some examples, the ranking loss function comprises a contrastive learning loss.

FIG. 10 shows an example of a process for training an image processing network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of an image processing network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1000, the system identifies training data including a set of images and similarity information for pairs of the images. In some cases, the operations of this step refer to, or may be performed by, a training component as described with reference to FIG. 6.

One or more embodiments of the present disclosure include systems and methods for image retrieval based on the scene content. A graph convolutional network (GCN) is used to obtain embeddings from ground-truth scene graphs of images. The network model is trained using a weak supervision signal of pairwise similarity preferences obtained from the text modality. A loss function based on relative similarity labels lead to increased performance of the derived embeddings in retrieval tasks.

At operation 1005, the system generates a scene graph of an image in the training data. In some cases, the operations of this step refer to, or may be performed by, a scene graph generator as described with reference to FIGS. 6 and 7.

At operation 1010, the system generates a scene graph embedding based on the scene graph using a GCN. In some cases, the operations of this step refer to, or may be performed by, a GCN as described with reference to FIGS. 6 and 7.

In some embodiments, a graph convolution network (GCN) is used to map the scene graph of an image into a scene graph embedding. In conventional systems, the GCN model can be trained using supervised, task-dependent methods. With respect to a self-supervised technique, scene graphs are jointly embedded with corresponding supplementary information (such as visual features or text) regarding the image. Following a task-dependent training technique, learning of the scene graph representation is driven by supervision from specific downstream applications. Unlike these existing image processing systems, one or more embodiments of the present disclosure train the GCN using a pairwise similarity matrix as the supervision signal where every value represents a noisy notion of similarity between the corresponding image pair. There are no assumptions on this similarity and hence the supervision is flexible. The similarities can be defined using text modality (e.g., image captions) or derived from other sources.

One or more embodiments of the present disclosure use scene graphs by leveraging caption similarities in a ranking context to learn robust representations. According to an embodiment, a loss function extracts signal from pairs of similar and dissimilar images, as in contrastive learning approach. Soft target labels are introduced based on relative similarities to appropriately weigh the extent of similarity or dissimilarity. Furthermore, retrieval performance is increased with the learnt representations.

At operation 1015, the system computes a ranking loss function based on the scene graph embedding and the similarity information. In some cases, the operations of this step refer to, or may be performed by, a training component as described with reference to FIG. 6.

In some examples, a supervised training model includes a loss function that compares predictions of the image processing network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

A ranking loss incorporates relative ranking constraints and outperforms other contrastive learning losses. Furthermore, comparative analysis of different triplet sampling strategies will be described below. Based on experiments, scene graph embeddings are proven robust to noise using a retrieval experiment with incomplete scene graph queries.

According to an embodiment, the ranking loss function takes the form of a cross entropy and is formulated as follows:

$$\mathcal{L} = -P \log \hat{P} - (1-P)\log(1-\hat{P}) \quad (7)$$

Optimizing the ranking loss function enables the network model to learn an embedding space in which the similarity between scene graph embeddings incorporates or considers the ordering or ranking indicated in the similarity matrix. The training of the image processing network and the system is configured such that similarity values $s\mathcal{A}_*$ are not assumed to be transitive or obey triangle inequalities, and the actual magnitude of the similarities is not part of the supervision, only the relative values. In some embodiments, the ranking loss enforces that the ordering of similarities of scene graph embeddings should consider or follow the ordering of the corresponding caption similarities. Note that the actual magnitude of similarities may not be used here, only the relative values. Therefore, the ranking loss imposes minimal requirements from the supervision signal.

At operation 1020, the system trains the GCN based on the ranking loss function. In some cases, the operations of this step refer to, or may be performed by, a training component as described with reference to FIG. 6.

In some embodiments, the system applies a learning objective that learns to respect pairwise similarity ranks or order. The formulation invokes a set of three images, the anchor, positive and negative, and the distance between anchor and positive is minimized and that between anchor and negative is maximized. However, unlike conventional retrieval systems based on classification, training herein does not include class labels. Rather, training of the network model includes a continuous spectrum of distances between images. Moreover, the system takes into account the fact that the similarity of a positive with respect to the anchor may be very close to that of the negative. The ranking loss function is designed to accommodate the selection of such samples during training.

FIG. 11 shows an example of a process for training an image processing network based on a ranking loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system identifies a positive sample and a negative sample for the image from the training data. In some cases, the operations of this step refer to, or may be performed by, a training component as described with reference to FIG. 6. The system also identifies an anchor image. In some examples, the image (as described in FIG. 10) is the anchor image.

One or more embodiments of the present disclosure map the scene graph for each image $\mathcal{A}$ in a collection of N images into its corresponding embedding $f_\mathcal{A}$ using GCN. The supervision signal for training the network is an N×N similarity matrix where entries $s_{xy}$ represent the measure of similarity between images $\mathcal{X}$ and $\mathcal{Y}$. These similarities are computed using textual captions of corresponding images because natural language is important in conveying semantics. Further, single-sentence, user-generated captions may focus on the entirety of the scene in an image.

One criterion is to set $\text{sim}(f_\mathcal{X}, f_\mathcal{Y}) \approx s_{xy}$. Unlike traditional systems treating the similarities $s_{xy}$ as direct regression targets, one or more embodiments include an image processing network that applies a contrastive learning technique to impose only ordering or ranking constraints. In an example experiment, each of the 20 plots show the sorted similarities $s_{\mathcal{A}\mathcal{X}} \forall \mathcal{X}$ for randomly chosen anchor images $\mathcal{A}$. In addition, the example experiment records relative frequencies of the absolute values of all pairwise similarity differences $|S_{\mathcal{A}X} - S_{\mathcal{A}Y}| \forall X, Y$ of the 20 selected anchors.

In the above example experiment, each curve corresponds to the sorted similarity values $S_{\mathcal{A}X}$ of all images $X$ with respect to an anchor image $\mathcal{A}$. It is observed that the image captions are equally distant from each other—represented by a range from 0.6 to 0.8 in the middle of the plots. In some cases, learning embeddings $f_*$ with regression objectives using Siamese or triplet architectures leads to degenerate solutions. As a result, the system relies on the text modality to only provide weak ranking supervision and the scene graphs are expected to contain complementary information.

At operation 1105, the system identifies a first similarity value between the image and the positive sample from the similarity information. In some cases, the operations of this step refer to, or may be performed by, a training component as described with reference to FIG. 6.

In some cases, text modality can be used to provide weak supervision, i.e., the image scene graphs contain complementary information, with the text captions providing a guiding signal for training the image processing network. As a result, the image processing network is dependent on that $\text{sim}(f_{\mathcal{A}}, f_P) > \text{sim}(f_{\mathcal{A}}, f_N)$ if $S_{\mathcal{A}P} > S_{\mathcal{A}N}$. The formulation includes a set of three images $\langle \mathcal{A}, \mathcal{P}, \mathcal{N} \rangle$ similar to some losses in contrastive learning. In some cases, the similarity of a positive image $\mathcal{P}$ with respect to the anchor image $\mathcal{A}$ may be very close to that of negative image $\mathcal{N}$. Therefore, $S_{\mathcal{A}P}$ and $S_{\mathcal{A}N}$ can occupy similar regions in the density plot of $S_{\mathcal{A}}$. As a result, a loss function is designed that is tolerant to the selection of such samples during training. In some cases, the first similarity value is also referred to as $S_{\mathcal{A}P}$ as described in the equation below.

At operation 1110, the system identifies a second similarity value between the image and the negative sample from the similarity information. The second similarity value is also denoted as $S_{\mathcal{A}N}$ in the equation below. In some cases, the operations of this step refer to, or may be performed by, a training component as described with reference to FIG. 6.

At operation 1115, the system computes a probability that the first similarity value is greater than the second similarity value. In some cases, the operations of this step refer to, or may be performed by, a training component as described with reference to FIG. 6. To reflect the constraints from relative similarities, the target value or target probably P is defined as the following:

$$P(s_{\mathcal{A}P} > s_{\mathcal{A}N}) = \frac{s_{\mathcal{A}P}}{s_{\mathcal{A}P} + s_{\mathcal{A}N}} \quad (8)$$

where $S_{\mathcal{A}P}$ and $S_{\mathcal{A}N}$ denote the caption similarity of the anchor with positive and negative respectively. In some examples, $S_{\mathcal{A}P}$ and $S_{\mathcal{A}N}$ are referred to as the first similarity value and the second similarity value, respectively. If both negative and positive are sampled with high confidence such that $S_{\mathcal{A}P} \gg S_{\mathcal{A}N}$, then P≈1. Such samples are not common in the present dataset. The setup/configuration is efficient because it allows use of samples where $S_{\mathcal{A}P}$ is only marginally more than $S_{\mathcal{A}N}$ with an appropriately weighted contribution to the objective (i.e., the positive is only marginally closer to the anchor than the negative). Therefore, use of non-binary targets is an alternative to the explicit mining of positive and negative samples.

FIG. 12 shows an example of a process for training an image processing network based on a ranking loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system identifies a positive sample and a negative sample for the image from the training data. The system identifies an image as an anchor image (i.e., the image described in FIG. 10). An anchor image, a positive sample, and a negative sample are also denoted as $\mathcal{A}$, $\mathcal{P}$, and $\mathcal{N}$, respectively. In some cases, the operations of this step refer to, or may be performed by, a training component as described with reference to FIG. 6.

At operation 1205, the system generates a positive scene graph embedding for the positive sample. GCN is used to generate a positive scene graph embedding $f_{\mathcal{P}}$. In some cases, the operations of this step refer to, or may be performed by, a GCN as described with reference to FIGS. 6 and 7.

At operation 1210, the system generates a negative scene graph embedding for the negative sample. GCN is used to generate a negative scene graph embedding $f_{\mathcal{N}}$. In some cases, the operations of this step refer to, or may be performed by, a GCN as described with reference to FIGS. 6 and 7.

At operation 1215, the system computes a first posterior similarity value based on an inner product of the positive scene graph embedding and the scene graph embedding. In an embodiment, the first posterior similarity value is denoted as $f_{\mathcal{A}}^T f_{\mathcal{P}}$. In some cases, the operations of this step refer to, or may be performed by, a training component as described with reference to FIG. 6.

At operation 1220, the system computes a second posterior similarity value based on an inner product of the negative scene graph embedding and the scene graph embedding. In an embodiment, the second posterior similarity value is denoted $f_{\mathcal{A}}^T f_{\mathcal{N}}$. In some cases, the operations of this step refer to, or may be performed by, a training component as described with reference to FIG. 6.

At operation 1225, the system computes a posterior probability that the first posterior similarity value is greater than the second posterior similarity value, where the ranking loss function is based on the posterior probability. In an embodiment, the posterior probability is denoted as $\hat{P}$. In some cases, the operations of this step refer to, or may be performed by, a training component as described with reference to FIG. 6.

In an embodiment, the system includes a loss function used to train the network model to learn image embeddings and optimize the network model under continuous space of similarities (or distances) between images. The system is configured in a different way than using discrete labels as in conventional classification tasks. The posterior probability $\hat{P}$ is modeled having similarities in the correct order as the following:

$$\hat{P}(f_{\mathcal{A}}^T f_{\mathcal{P}} > f f_{\mathcal{A}}^T f_{\mathcal{N}}) = \sigma\left(\frac{f_{\mathcal{A}}^T f_{\mathcal{P}} - f_{\mathcal{A}}^T f_{\mathcal{N}}}{v}\right) \quad (9)$$

where σ is the sigmoid function, v is a temperature hyperparameter and the similarity function $\text{sim}(f_\mathcal{A}, f_\mathcal{X})$ is calculated using the inner product $f_\mathcal{A}^T f_\mathcal{X}$. For a given anchor $\mathcal{A}$, $\mathcal{P}$ (positive) and $\mathcal{N}$ (negative) are such that the pair ($\mathcal{A}, \mathcal{P}$) are expected to be more similar than ($\mathcal{A}, \mathcal{N}$). Since the corresponding embeddings $f_*$ are $\ell_2$-normalized, the inner products above correspond to using cosine similarity.

Sampling Techniques

According to some embodiments, the network model applies different strategies to sample a positive $\mathcal{P}$ and negative $\mathcal{N}$ for a given anchor image $\mathcal{A}$. This is done by leveraging the caption similarities $S_{\mathcal{A}\mathcal{X}}$ of the anchor $\mathcal{A}$ with every other image $\mathcal{X}$. The sampling alternatives at least include random sampling, extreme-type sampling, probability sampling and reject-type sampling.

In an embodiment, the network model applies random sampling. Given an anchor $\mathcal{A}$, the network model samples uniformly at random a positive-negative pair $\langle \mathcal{P}, \mathcal{N} \rangle$ from the set of all correctly ordered pairs given by:

$$\{\langle \mathcal{P}', \mathcal{N}' \rangle | S_{\mathcal{A}\mathcal{P}_{40}} > S_{\mathcal{A}\mathcal{N}_{40}}\} \quad (10)$$

While random sampling as described above ensures that the positive is closer to the anchor than the negative, it may not consider the relative distances between them.

In an embodiment, the network model applies extreme sampling technique. For every anchor image $\mathcal{A}$, the network model chooses the most similar image as the positive $\mathcal{P}$ and the most dissimilar image as the negative $\mathcal{N}$. $\mathcal{P}$ and $\mathcal{N}$ are sampled using the following formulation:

$$\mathcal{P} = \underset{\mathcal{P}'}{\operatorname{argmax}} s_{\mathcal{A}\mathcal{P}'} \quad (11)$$

$$\mathcal{N} = \underset{\mathcal{N}'}{\operatorname{argmin}} s_{\mathcal{A}\mathcal{N}'} \quad (12)$$

The extreme sampling technique is a deterministic method, i.e., same positive and negative examples are used for a given anchor across epochs.

In an embodiment, the network model applies probability-based sampling method, i.e., samples the positive and negative based on the caption similarities with the anchor as the following:

$$P(\mathcal{P}) = \frac{s_{\mathcal{A}\mathcal{P}}}{\sum_{\mathcal{P}'} s_{\mathcal{A}\mathcal{P}'}} \quad (13)$$

$$P(\mathcal{N}) = \frac{1 - s_{\mathcal{A}\mathcal{N}}}{\sum_{\mathcal{N}'} (1 - s_{\mathcal{A}\mathcal{N}'})} \quad (14)$$

In this embodiment, the upper limit of caption similarities $S_{\mathcal{A}\mathcal{X}}$ is 1 and therefore, $1 - S_{\mathcal{A}\mathcal{X}}$ is a measure of distance between images $\mathcal{A}$ and $\mathcal{X}$. This sampling technique ensures that images closer (or farther) to the anchor should have a higher probability of being sampled as the positive (or negative).

In some examples, sampling based on similarities may lead to cases where $\mathcal{J}$ is closer to $\mathcal{A}$ than $\mathcal{P}$. In an embodiment, an additional constraint is added to the probability-based sampling technique described above. The added constraint is imposed on the direction of pairwise similarities, i.e., rejecting samples where $S_{\mathcal{A}\mathcal{P}} < S_{\mathcal{A}\mathcal{N}}$.

The loss functions use strategies where hard negatives are coupled with a positive, or conversely easy positives alongside negatives to aid learning. The ranking loss and sampling techniques are configured to leverage as many of the N2 positive-negative pairs for a given anchor as possible. In some example, it is beneficial to have multiple negatives and multiple positives per anchor.

Evaluation

Performance of apparatus, systems and methods of the present disclosure have been evaluated, and results indicate embodiments of the present disclosure have obtained increased performance over existing technology. Example experiments demonstrate that the image processing network outperforms conventional systems.

The network model uses a database that connects structured image concepts to language, for example, visual genome dataset is a collection of 108,077 images and their scene graphs. A subset of 51,498 images with a set of five user-provided textual captions are used in an object recognition dataset (e.g., Microsoft® Common Objects in Context (MS COCO)). In some examples, object and relationship types that occur at least 25 times are filtered out, resulting in 2416 object and 478 relationship categories. Images have a minimum of 3 and a maximum of 40 objects, and at least one relationship. This results in 45,358 images with an average of 21 objects and 15 relationships per image. The dataset is split into training, validation and test sets in a 70:20:10 split. Furthermore, the five captions available for each image are considered and embedded by taking the average of the constituent word embeddings. The image similarities $s_{xy}$ are defined as the average of the 5×5=25 pairwise inner products over caption embeddings.

The objects and relationships are embedded into a d=300 dimensional space using separate learnable layers. These are initialized with the average of constituent word embeddings (e.g., global vectors for word representation, or GloVe embeddings). The intermediate messages for nodes are h=512 size vectors, while the final node and edge states of each layer are D=300 size vectors. For multi-layer perceptrons, a non-linear activation function (e.g., ReLU) and batch normalization are used. In some examples, the network model includes five GCN layers and is trained using an optimization gradient descent algorithm (e.g., Adam optimizer) for 100 epochs with learning rate $10^{-4}$ and batch size 16. The temperature parameter in the loss functions (i.e., InfoNCE and ranking loss) has been set to λ=1 and v=1 and the margin in triplet loss to m=0.5. In some examples, the network model is trained on an Ubuntu 16.01 machine, using a single Tesla V100 GPU and PyTorch framework.

The GCN output $f_\mathcal{X}$ is computed for every image $\mathcal{X}$ in the test set and the pairwise similarities are derived and formulated as $\text{sim}(f_x, f_y) = f_x^T f_y$. For example, these scene graph similarities are compared against the corresponding caption equivalents $s_{xy}$ using Kendall rank correlation coefficient τ, Spearman's rank correlation coefficient ρ and Pearson correlation coefficient r. The two rank correlations are important as the network model described herein is trained on relative similarities (i.e., not absolute values). The network model computes the metrics at two levels (i.e., per image or row-wise and across all pairs). The micro-averaged option of computing row-wise correlation between model-derived scene graph similarities $\text{sim}(f_\mathcal{X}, f_*)$ and caption similarities $s_{\mathcal{X}*}$ reflect the retrieval focus.

The ranking loss function outperforms the losses in contrastive learning methods (e.g., triplet and InfoNCE) for any sampling. For example, random sampling method is a robust alternative across loss functions among the four sampling methods, and the extreme sampling method is a weak deterministic sampling strategy. Comparing probability-based sampling method and reject sampling method, the triplet and InfoNCE losses that utilize binary labels outperform when coupled with reject sampling method. Probability-based sampling method outperforms in ranking loss as it is based on soft target labels and can handle invalid triples (when the positive is further away from the anchor than the negative). The network model achieves the best performance when it is trained using ranking loss and probability-based sampling combination, which has a Kendall τ of 0.391. A perfect value of 1 indicates that the scene graph modality contains redundant information with respect to the textual captions. This is not desirable in some cases. The model involving classification features has a competitive performance considering they are pre-trained and not customized to current tasks. A qualitative comparison illustrates the differences between the two embeddings.

Experiments and evaluation demonstrate that methods and systems of the present disclosure have increased performance in applications such as image retrieval. One or more embodiments of the present disclosure demonstrate the robustness of scene graph embeddings to missing objects and relationships during information retrieval. The network model trained over observed scene graphs can produce scene graph embeddings that implicitly contain contextual information about objects that tend to co-occur and their relationships. Every image in the test dataset is considered and increasing levels of noise are added into the scene graphs. A set of M edges chosen at random from the scene graph are eliminated and subsequently isolated objects which are disconnected from the rest of the graph are dropped. This noisy scene graph is passed through the GCN to obtain a query embedding which is issued against the test set. Experiments include examining the ranked list of items and evaluating the model performance of retrieving the known image. The objective and sampling combination where the relevant image is returned in top ranks despite noisy input is not affected in any way by incomplete information in the query.

The results for noise level M=12 (corresponds to the median number of edges across scene graphs) are recorded and evaluated. In an embodiment, the retrieval performance is computed using standard metrics (e.g., mean reciprocal rank (MRR), Recall@1 and Recall@5) averaged over all images in the test set. It is observed that the ranking loss outperforms variants of other two losses and the network trained based on the ranking loss generates embeddings that are more effective than triplet and InfoNCE losses (i.e., training the network using the two losses). The image processing network reaches a best performance when it is trained using ranking loss along with the probability-based sampling method based on similarities. For example, the target image is returned in the top-5 ranks (out of 4537 in the test set) in more than 90% of the cases. The increased levels of recall are observed in the ranked list.

A chosen number of edges (and isolated objects) are removed from the query scene graph up to a maximum of 20 edges (corresponds to 3rd quartile for the number of edges across scene graphs) to tune the noise parameter for purpose of generalization. The network model computes the same metrics as before, but attention is restricted to the best sampling strategy for each objective. It is shown that the ranking loss along with probability-based sampling method has the best performance for the three metrics. For example, a nearest neighbor search in the embedding space places the target image at rank 1 in over 70% of the cases despite removing 75% of edges in the query scene graph. This indicates that the scene graph representations are robust, graph convolution network is efficient in computing image embeddings, and the ranking loss is effective utilizing pairwise similarity constraints as a weak supervision signal.

One or more embodiments of the present disclosure include an image processing apparatus configured to perform image retrieval based on scene content. A graph convolutional network (GCN) is used for embedding scene graphs of images, such that the image processing apparatus bridges the semantic gap in image retrieval. An image processing network is trained using a weak supervision signal of pairwise similarity preferences. The objective loss function used to train the network outperforms conventional contrastive losses, and is robust to noise.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:
1. A method for information retrieval, comprising:
receiving a search query from a user;
generating a query embedding for the search query;
identifying an image comprising a plurality of objects;
generating a scene graph of the image comprising a node representing an object and an edge representing a relationship between two of the objects;
generating a node vector for the node, wherein the node vector represents semantic information of the object;
generating an edge vector for the edge, wherein the edge vector represents semantic information of the relationship;
generating a scene graph embedding using a graph convolutional network (GCN) that performs a convolution on the scene graph based on the node vector and the edge vector;
assigning metadata to the image based on the scene graph embedding;
storing the image in a database together with the metadata;
retrieving the image from the database based on the metadata and a similarity between the query embedding and the scene graph embedding; and
displaying the image to the user.
2. The method of claim 1, further comprising:
updating the edge vector based on a source node and a target node;

updating the node vector based on an incoming edge or an outgoing edge; and wherein the scene graph embedding is based on the updated edge vector and the updated node vector.

3. The method of claim 2, further comprising:

computing an average of updated node vectors for each node of the scene graph, wherein the scene graph embedding is based on the average.

4. The method of claim 1, further comprising:

creating a dummy node; and creating a dummy edge for each node of the scene graph, wherein the dummy edge connects the dummy node to a corresponding node of the scene graph.

5. An apparatus comprising:

at least one processor;

at least one memory storing instructions executable by the at least one processor, wherein the instructions, when executed by the processor are operable to:

receiving, using a search component, a search query from a user;

generating a query embedding for the search query;

generate, using a scene graph generator, a scene graph of an image comprising a node representing an object and an edge representing a relationship between two of the objects;

generate, using a word embedding component, a node vector for the node, wherein the node vector represents semantic information of the object and an edge vector for the edge, and wherein the edge vector represents semantic information of the relationship;

generate, using a graph convolutional network (GCN) that performs a convolution on the scene graph based on the node vector and the edge vector, a scene graph;

assign, using a metadata component, metadata to the image based on the scene graph embedding;

store the image in a database together with the metadata;

retrieve the image from the database based on the metadata and a similarity between the query embedding and the scene graph embedding; and display the image to the user.

6. The apparatus of claim 5, wherein:

the GCN comprises a plurality of convolution layers, wherein each of the convolution layers is configured to update the node vector and the edge vector.

7. The apparatus of claim 6, further comprising:

combine, using an aggregation layer, the updated node vector and the updated edge vector to produce the scene graph embedding.

8. A non-transitory computer readable medium storing code for information retrieval, the code comprising instructions executable by at least one processor to:

receive a search query from a user;

generate a query embedding for the search query;

identify an image comprising a plurality of objects;

generate a scene graph of the image comprising a node representing an object and an edge representing a relationship between two of the objects;

generate a node vector for the node, wherein the node vector represents semantic information of the object;

generate an edge vector for the edge, wherein the edge vector represents semantic information of the relationship;

generate a scene graph embedding using a graph convolutional network (GCN) that performs a convolution on the scene graph based on the node vector and the edge vector;

assign metadata to the image based on the scene graph embedding;

store the image in a database together with the metadata;

retrieve the image from the database based on the metadata and a similarity between the query embedding and the scene graph embedding; and display the image to the user.

9. The non-transitory computer readable medium of claim 8, the code further comprising instructions executable by the at least one processor to:

update the edge vector based on a source node and a target node;

update the node vector based on an incoming edge or an outgoing edge; and wherein the scene graph embedding is based on the updated edge vector and the updated node vector.

10. The non-transitory computer readable medium of claim 9, the code further comprising instructions executable by the at least one processor to:

compute an average of updated node vectors for each node of the scene graph, wherein the scene graph embedding is based on the average.

11. The non-transitory computer readable medium of claim 8, the code further comprising instructions executable by the at least one processor to:

create a dummy node; and create a dummy edge for each node of the scene graph, wherein the dummy edge connects the dummy node to a corresponding node of the scene graph.

* * * * *